United States Patent
Kuzhiyil

(10) Patent No.: US 11,495,099 B2
(45) Date of Patent: Nov. 8, 2022

(54) METHODS AND SYSTEMS FOR PROVIDING STATUS INDICATORS WITH AN ELECTRONIC DEVICE

(71) Applicant: Motorola Mobility LLC, Chicago, IL (US)

(72) Inventor: Francis Kuzhiyil, Deerfield, IL (US)

(73) Assignee: Motorola Mobility LLC, Chicago, IL (US)

( * ) Notice: Subject to any disclaimer, the term of this patent is extended or adjusted under 35 U.S.C. 154(b) by 189 days.

(21) Appl. No.: 16/910,603

(22) Filed: Jun. 24, 2020

(65) Prior Publication Data

US 2021/0407260 A1  Dec. 30, 2021

(51) Int. Cl.
| | |
|---|---|
| G08B 5/36 | (2006.01) |
| H04M 1/725 | (2021.01) |
| G06F 1/16 | (2006.01) |
| H04M 1/72448 | (2021.01) |

(52) U.S. Cl.
CPC ............. G08B 5/36 (2013.01); G06F 1/1637 (2013.01); H04M 1/72448 (2021.01)

(58) Field of Classification Search
CPC . G08B 5/36; G06F 1/1637; G06F 2200/1637; G06F 1/1626; G06F 1/165; G06F 1/1652; G06F 1/1694; G06F 2203/04803; G06F 3/04886; G06F 11/328; G06F 2203/04105; G06F 1/1684; G06F 3/017; H04M 1/72448
See application file for complete search history.

(56) References Cited

U.S. PATENT DOCUMENTS

| | | | | |
|---|---|---|---|---|
| 9,715,283 | B2* | 7/2017 | Elkins | G06F 1/1694 |
| 2013/0120106 | A1* | 5/2013 | Cauwels | A61B 5/01 |
| | | | | 361/728 |
| 2013/0191741 | A1* | 7/2013 | Dickinson | G06F 1/1698 |
| | | | | 715/702 |
| 2014/0153405 | A1* | 6/2014 | Pane | H04L 65/1059 |
| | | | | 370/241 |
| 2015/0074615 | A1* | 3/2015 | Han | H04L 63/0815 |
| | | | | 715/863 |

(Continued)

OTHER PUBLICATIONS

"Kuando Busylight UC Omega", Unknown exact publication date but believed to be prior to filing of present application; Viewed online Jun. 24, 2020 at https://busylight.com/kuando-busylight-uc-omega/.

(Continued)

*Primary Examiner* — Adnan Aziz
(74) *Attorney, Agent, or Firm* — Philip H. Burrus, IV

(57) ABSTRACT

An electronic device includes one or more sensors, one or more processors operable with the one or more sensors, and a status indicator configured to indicate whether an authorized user of the electronic device is busy, free, or somewhere in between. The status indicator can operate in at least a first state and a second state that is different from the first state. The first state indicates the authorized user is busy and should not be disturbed, while the second state indicates the authorized user is free. Red light can be emitted in the first state, and green light in the second state. The state of the status indicator can be set manually, such as with a chopping gesture, or automatically, such as from calendar events stored in a calendaring operation.

20 Claims, 6 Drawing Sheets

(56) References Cited

U.S. PATENT DOCUMENTS

| | | | | |
|---|---|---|---|---|
| 2017/0364153 | A1* | 12/2017 | Kazansky | G06F 3/011 |
| 2018/0276957 | A1* | 9/2018 | Ibrahim | H04R 1/10 |
| 2018/0351373 | A1* | 12/2018 | Behzadi | H02J 7/02 |
| 2020/0057525 | A1* | 2/2020 | Prest | G06F 1/1688 |
| 2021/0337646 | A1 | 10/2021 | Zhu | |
| 2021/0374391 | A1* | 12/2021 | Jorasch | G06V 40/10 |

OTHER PUBLICATIONS

"Luxafor Bluetooth LED Busy Light Indicator", Available on Amazon prior to Filing of Present Application; Viewed online Aug. 11, 2020 at https://www.amazon.com/.

"Samsung Display", Edge Lighting for notifications; Published prior to filing of present application; Viewed online Aug. 11, 2020 at https://www.samsung.com/us/support/answer/ANS00077671/.

"Skype for Business—Automatic Status based on Outlook", Instructions available at https://kb.nmsu.edu/74085; Viewed online Jun. 24, 2020; Published prior to filing of present application.

"Skype for Business—Manually set Status", Screenshot of Status Indicator in Skype for Business; Screenshot taken prior to filing of Present Application; Viewed Jun. 24, 2020.

\* cited by examiner

METHODS AND SYSTEMS FOR PROVIDING STATUS INDICATORS WITH AN ELECTRONIC DEVICE

BACKGROUND

Technical Field

This disclosure relates generally to electronic devices, and more particularly to electronic devices with visible output devices.

Background Art

Portable electronic device usage has become ubiquitous. Vast majorities of the population carry a smartphone, tablet computer, or laptop computer daily to communicate with others, stay in formed, to consume entertainment, and to manage their lives.

As the technology incorporated into these portable electronic devices has become more advanced, so to has their feature set. A modern smartphone includes more computing power than a desktop computer did only a few years ago. Additionally, while early generation portable electronic devices included only low-resolution, black and white displays, most modern portable electronic devices include vivid, high-resolution, multi-color displays. It would be advantageous to have an improved electronic device drawing new functionality from these new features.

Figure 1:
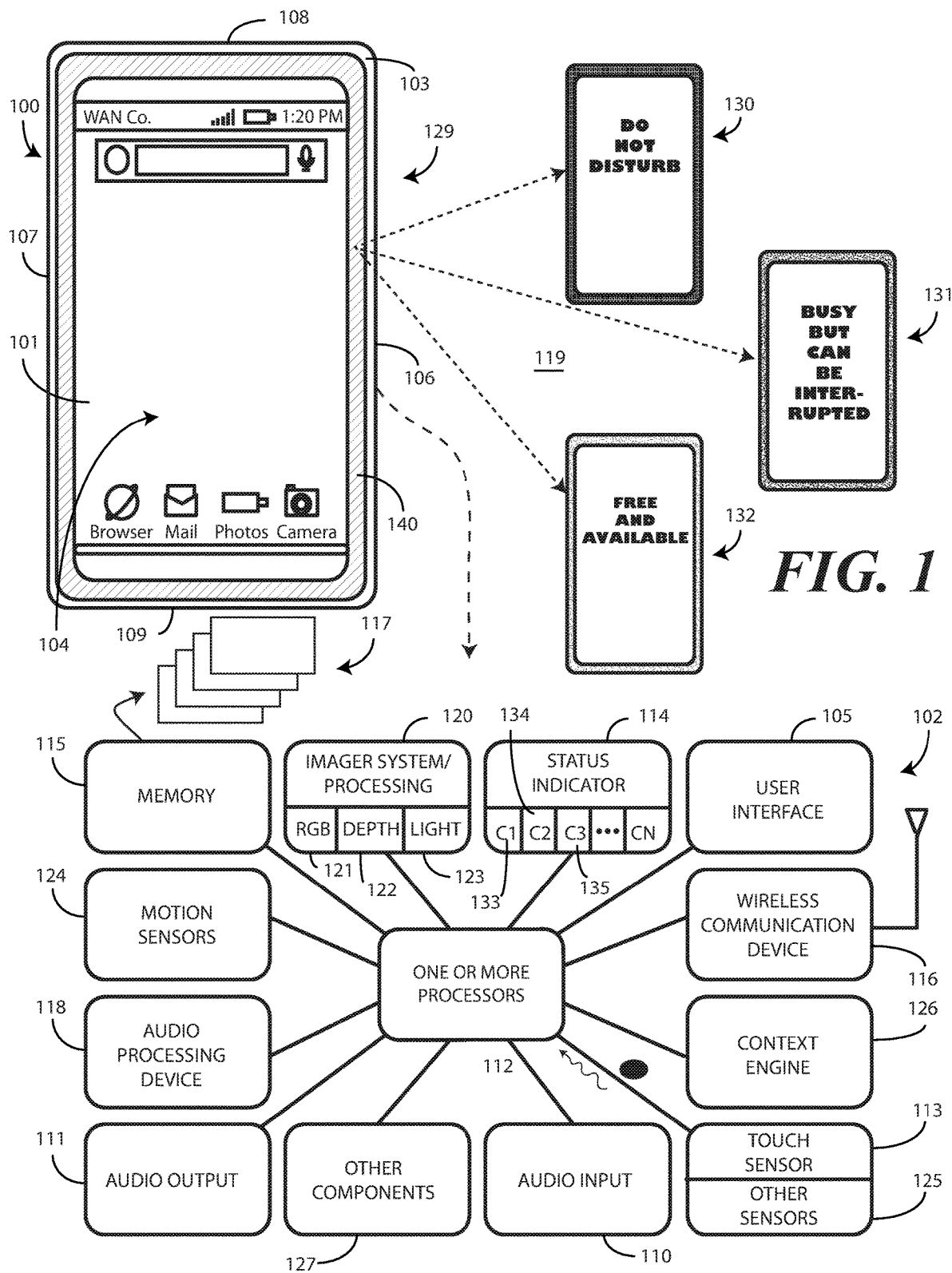
FIG. 1 illustrates one explanatory electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to presenting a status indicator on an electronic device. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of presenting status indicators from an electronic device as described herein. The non-processor circuits may include, but are not limited to, a radio receiver, a radio transmitter, signal drivers, clock circuits, power source circuits, and user input devices.

As such, these functions may be interpreted as steps of a method to perform the presentation of status indicators from an electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, directional terms such as "up," "down," "vertical," "horizontal," are intended to refer to the context of the electronic device being described. For example, a graphical object representing a rotatable item may be presented on a touch sensitive display or surface, where that touch sensitive display is shown in an elevation view around defined X, Y, and Z axes. In those examples, the X-Y plane will define the horizontal, with directions out of the page being defined as the negative Y direction and directions into the page being defined as the positive Y direction. Up will be defined as the positive Z direction and down will be defined as the negative Z direction. Thus, as described below when the rotatable item visually rotates "into the display" or "into the device" or "into the touch sensitive surface, this refers to visual rotation of the rotatable item occurs about an axis lying either within the X-Z plane (when presented in an elevation view), or in the X-Y plane, but askew the Y axis (when presented in a perspective view), with portions of the rotatable item to one side of the axis appearing to move in the positive Y direction, while other portions on the other side of the axis appear to rotate in the negative Y direction, and so forth.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within one percent and in another embodiment within one half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device and corresponding methods configured to present a personal status identifier from an electronic device. Embodiments of the disclosure contemplate that with the ubiquity of electronic devices such as smartphones, people interact with these devices almost constantly. Embodiments of the disclosure contemplate that it can be difficult for a third party who sees a person interacting with a smartphone, for example, to know whether that person is working or performing another task during which they do not wish to be disturbed, or simply playing solitaire during which they do not mind being interrupted.

Advantageously, embodiments of the disclosure provide electronic devices and corresponding methods for presenting a status identifier output with an electronic device. In one or more embodiments, one or more processors of the electronic device receive actuation event input causing a status identifier output to be presented. The actuation event input can take various forms. Illustrating by example, in one or more embodiments the actuation event input comprises a user gesture translating the electronic device in three-dimensional space to cause the status indicator output to be presented. In other embodiments, the actuation event input comprises an operation being performed at the electronic device, such as receiving a telephone call. In still other embodiments, the actuation event input comprises commencement of an event stored in a calendaring application. Other examples of actuation event inputs will be described below with reference to FIG. 8. Still others will be obvious to those of ordinary skill in the art having the benefit of this disclosure.

In one or more embodiments, when an actuation event input is detected, one or more processors of the electronic device cause a status indicator of the electronic device to present a status indicator output at a user interface of the electronic device. Illustrating by example, in one or more embodiments the one or more processors cause unused portions of the display, such as a perimeter band of the display, to present the status indicator output. In another embodiment, an electronic device includes an illuminated indicator band positioned along the device housing of the electronic device that is configured to illuminate to provide the status indicator output. In still other embodiments, an electronic device is configured with a display that wraps about the sides of the electronic device, with those side portions presenting the status indicator output. Other configurations of electronic devices capable of presenting the status indicator output will be obvious to those of ordinary skill in the art having the benefit of this disclosure.

In one or more embodiments, the status indicator comprises a visible output device presenting a predefined color to indicate a status of the user. Illustrating by example, when the status indicator output is red, this may indicate that the user does not wish to be disturbed. When the status indicator output is yellow, this may indicate that the user is occupied and is doing something, but does not mind being disturbed. When the status indicator output is green, this may mean that the user is free and can be interrupted, and so forth.

Embodiments of the disclosure contemplate that the design parameters used in designing modern electronic devices, such as smartphones and tablet computers, frequently result in an increasing screen-to-device housing ratio. Said differently, embodiments of the disclosure contemplate that displays of modern electronic devices are getting larger, while the device housings supporting those displays remain relatively constant. Embodiments of the disclosure contemplate that many modern electronic devices will also have multiple displays or, alternatively, displays that wrap around a device housing to provide a continuous display around the same.

Embodiments of the disclosure also contemplate that some of this increased display surface area will frequently go unused. Illustrating by example, where the display wraps from a major face around minor faces positioned along the sides of a device housing, that a person may not want personal information, data, or content to be presented where third parties can see the same. Advantageously, in one or more embodiments the methods and systems described below take advantage of this additional display area and use it to present a status indicator output for the purpose of displaying a user status to nearby people.

The benefits of using the perimeter of a primary display, or alternatively the sides of an electronic device, to present a status indicator output are numerous. First and foremost, these portions of displays or electronic devices are generally readily visible to others. This is especially true when the sides of the electronic device are used to present the status indicator output. Second, the status indicator outputs presented in accordance with the embodiments require very little power of the displays presenting the same. Accordingly, the presentation of the status indicator output can conserve energy in comparison to presenting other forms of information. Third, as noted above, many people do not want the information they are viewing on the primary display to be visible on the sides of the electronic device, as this would allow third parties to see the information. Accordingly, the presentation of the status indicator output provides a good use for this additional space.

To better illustrate how the status indicators of the present disclosure can be used, consider the situation where a user is in a conference call. In one or more embodiments, the methods and systems described below would present a red status indicator output along the sides of the electronic device, thereby alerting third parties to the fact that the user is busy and should not be disturbed. Similarly, consider a student doing homework or studying for an exam. The student may not want anyone to interrupt. Accordingly, the student may deliver user input to the electronic device causing a red status indicator output to be presented. In a restaurant, the presentation of a status indicator output indicating that one should not be disturbed would allow a waiter to see that the diner is busy and should not disturb the conversation. These are just a few examples of how the presentation of the status indicator output in accordance with embodiments of the disclosure would be beneficial. Numerous others will be obvious to those of ordinary skill in the art having the benefit of this disclosure.

In one or more embodiments, an electronic device includes one or more indicator bands configured to present a status indicator output. In one or more embodiments, these indicator bands are positioned on the sides of an electronic device, such as a smartphone, for the purpose of displaying a user status to nearby people. Illustrating by example, in one embodiment an electronic device is equipped with a unitary pre-formed glass fascia that spills along the minor faces of the electronic device. In one or more embodiments a first arched bridging member and second arched bridging member can be configured to present the status indicator output while the user of the electronic device views other content on the planar portion of the unitary pre-formed glass fascia separating the first arched bridging member and the second arched bridging member.

In one or more embodiments, a user delivers manual input to the electronic device to actuate the presentation of the status indicator output. Illustrating by example, the user may make a gesture translating the electronic device in three-dimensional space to cause the status indicator to turn ON by transitioning to a first state. If the first state is not the desired state, in one or more embodiments the user repeats the gesture, transitioning from one state to the next with each gesture, until the desired status indicator output is being presented. In one or more embodiments, the user can then turn the status indicator OFF by again repeating the gesture.

In one or more embodiments, the presentation of the status indicator output is automatic. Illustrating by example, in one or more embodiments one or more processors of an electronic device are operable with a calendaring application. When an event scheduled in the calendaring application commences, the one or more processors can cause the presentation of a status indicator output. When the event terminates, the one or more processors can cause the presentation of the status indicator output to cease. In one or more embodiments, a user can define, when creating the event in the calendaring application, which status indicator output should be presented while the event is in progress.

When the one or more processors of the electronic device detect an actuation event input while the status indicator output is not being presented, they can commence the presentation of the status indicator output. Where the actuation event input is a manual action, such a user gesture, a double-tap on a display, actuation of a user actuation target or other manual input embodiments of the disclosure provide a natural, immediate, and intuitive method of actuating the status indicator without the necessity of navigating multiple menus or complicated applications. With an electronic device configured in accordance with embodiments of the disclosure, a user can trigger, activate, actuate, or initiate the presentation of a status indicator output via simple gesture motions in one or more embodiments.

In one or more embodiments, the one or more processors of the electronic device initially, upon actuation, present the status indicator output in a first state in response to the one or more processors detecting the actuation event. Using the red-yellow-green example from above, in one or more embodiments when the one or more processors detect the actuation event, they cause the status indicator to operate in a first state by emitting light with a first predefined color, such as red.

In one or more embodiments, while the one or more processors are operating the status indicator in the first state, the one or more processors continue to monitor for additional actuation event inputs. Continuing the red-green-yellow example, embodiments of the disclosure contemplate that a second actuation event input, such as a gesture motion translating the electronic device in a back and forth or chopping motion in three-dimensional space, may cause the one or more processors to transition the status indicator from operating in the first state to a second state. In one or more embodiments, the second state is different from the first state. Thus, the one or more processors may cause the status indicator output to change from red to yellow, and so forth. This process can continue with the one or more processors transitioning the status indicator output from yellow to green in response to a third actuation event input, and then from green to OFF in response to a fourth actuation event input, and so forth.

While color is one way of indicating a person's status that will be described for explanatory purposes below, the methods and systems for presenting the status indicator output can be extended to other indicators as well. Illustrating by example, where the minor faces of the electronic device have sufficient space, the words "DO NOT DISTURB" may be presented on the sides of the electronic device rather than color. Other examples of indicators for communicating the status of a user to third parties will be obvious to those of ordinary skill in the art having the benefit of this disclosure.

Turning now to FIG. 1, illustrated therein is one explanatory electronic device 100 configured in accordance with one or more embodiments of the disclosure. It should be noted that the electronic device 100 can be one of various types of devices. In one embodiment, the electronic device 100 is a portable electronic device, one example of which is a smartphone that will be used in the figures for illustrative purposes. However, it should be obvious to those of ordinary skill in the art having the benefit of this disclosure that the electronic device 100 could be other types of devices as well, including palm-top computers, tablet computers, gaming devices, media players, wearable devices, or other portable wireless communication devices. Still other devices will be obvious to those of ordinary skill in the art having the benefit of this disclosure.

Also illustrated in FIG. 1 is one explanatory block diagram schematic 102 of the explanatory electronic device 100 of FIG. 1. It should be understood that FIG. 1 is provided for illustrative purposes only and for illustrating components of one electronic device 100 in accordance with embodiments of the disclosure, and is not intended to be a complete block diagram schematic 102 of the various components that can be included with the electronic device 100. Therefore, other electronic devices in accordance with embodiments of the disclosure may include various other components not shown in FIG. 1, or may include a combination of two or more components or a division of a particular component into two or more separate components, and still be within the scope of the present disclosure.

In one or more embodiments, the block diagram schematic 102 is configured as a printed circuit board assembly disposed within a device housing 103 of the electronic device 100. Various components can be electrically coupled together by conductors or a bus disposed along one or more printed circuit boards.

The illustrative block diagram schematic 102 of FIG. 1 includes many different components. Embodiments of the disclosure contemplate that the number and arrangement of such components can change depending on the particular application. Accordingly, electronic devices configured in accordance with embodiments of the disclosure can include some components that are not shown in FIG. 1, and other components that are shown may not be needed and can therefore be omitted.

In one or more embodiments, the device housing 103 of the electronic device 100 defines a first major surface 104 and a second major surface (the rear surface that is opposite major surface 104). In one or more embodiments, the first major surface 104 and the second major surface are separated by one or more minor surfaces 106,107,108,109 as well. In one or more embodiments, a user interface 105 of the electronic device 100 includes a first display 101 positioned on the first major surface 104 of the electronic device 100. In one or more embodiments, the user interface 105 optionally includes a second display positioned on the second major surface of the electronic device 100. As will be described in more detail below with reference to FIG. 3, the electronic device 100 may also include one or more displays on the one or more minor surfaces 106,107,108,109 as well.

As will be described below with reference to FIGS. 4-5, embodiments of the disclosure also contemplate that modern electronic devices can include a single display that wraps about the device housing 103 of the electronic device 100. For example, the single display may have a first portion that serves as the first display 101, a second portion that wraps around minor surface 106, and a third portion that serves as the second display. Thus, while an electronic device 100 with one display is described with reference to FIG. 1, in other embodiments the electronic device can include multiple displays or a single display that wraps about multiple faces of the electronic device 100.

In one or more embodiments, both the first display 101 and (where included) the second display comprise touch sensitive displays. Where so configured, information, graphical objects, user actuation targets, and other graphical indicia can be presented using these display(s). In one or more embodiments, so as to be touch sensitive, each display 101 comprises a corresponding touch sensor 113.

In one or more embodiments, the touch sensor 113 can comprise any of a capacitive touch sensor, an infrared touch sensor, resistive touch sensors, inductive touch sensing, another touch-sensitive technology, or combinations thereof. Capacitive touch-sensitive devices include a plurality of capacitive sensors, e.g., electrodes, which are disposed along a substrate. Where so configured, each capacitive sensor can be configured, in conjunction with associated control circuitry, e.g., the one or more processors 112, to detect an object in close proximity with—or touching—the surface of the display(s) by establishing electric field lines between pairs of capacitive sensors and then detecting perturbations of those field lines.

The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on the substrate. Indium tin oxide is useful for such systems because it is transparent and conductive. Other technologies include metal mesh, silver nano wire, graphine, and carbon nanotubes. Further, it is capable of being deposited in thin layers by way of a printing process. The capacitive sensors may also be deposited on the substrate by electron beam evaporation, physical vapor deposition, or other various sputter deposition techniques.

In one or more embodiments, users can deliver user input to the first display 101 and/or other displays by delivering touch input from a finger, stylus, or other objects disposed proximately with the first display 101 and/or the other displays. In one embodiment, the first display 101 and/or the other displays are configured as an active matrix organic light emitting diode (AMOLED) display. However, it should be noted that other types of displays, including liquid crystal displays, are suitable for use with the user interface and would be obvious to those of ordinary skill in the art having the benefit of this disclosure.

Other features can be situated on either the first major surface 104 or the second major surface in addition to the first display 101 and/or any other displays. For instance, a user interface component such as a button or other control device can also be disposed on either the first major surface 104 or the second major surface to facilitate additional control of the electronic device 100. Other features can be added, and can be located on the front of the device housing 103, sides of the device housing 103, or the rear of the device housing 103. Illustrating by example, in one or more embodiments an imager or a loudspeaker can be positioned on either the first major surface 104 or the second major surface.

While the electronic device 100 is illustrated as being a hand-held device in FIG. 1, it could also be configured as a wearable device. Illustrating by example, electronic devices configured in accordance with embodiments of the disclosure can include a housing and one or more straps that allow the electronic device to be worn around a wrist as a watch or folded over and clipped to a garment. Other types of wearable electronic devices and/or other mechanical configurations of wearable electronic devices will be obvious to those of ordinary skill in the art having the benefit of this disclosure.

The block diagram schematic 102 of FIG. 1 is not intended to be a complete schematic diagram of the various components required for an electronic device 100. Therefore, other electronic devices in accordance with embodiments of the disclosure may include various other components not shown in FIG. 1, or may include a combination of two or more components or a division of a particular component into two or more separate components, and still be within the scope of the present disclosure.

The illustrative block diagram schematic 102 of FIG. 1 includes many different components. Embodiments of the disclosure contemplate that the number and arrangement of such components can change depending on the particular application. For example, a wearable electronic device may have fewer, or different, components from a non-wearable electronic device. Similarly, an electronic device configured as a dedicated voice assistant may have fewer, or different, components from a smartphone, and so forth. Accordingly, electronic devices configured in accordance with embodiments of the disclosure can include some components that are not shown in FIG. 1, and other components that are shown may not be needed and can therefore be omitted.

The illustrative block diagram schematic 102 includes a user interface 105. In one or more embodiments, the user interface 105 includes the display 101 and one or more other sensors 125. The one or more other sensors 125 can include a touch sensor 113, as well as other sensors that which will be described in more detail below.

In one embodiment, the electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 102. Each of the application processor and the auxiliary processor(s) can be configured to process and execute executable software code to perform the various functions of the electronic device 100 with which the block diagram schematic 102 operates. A storage device, such as memory 115, can optionally store the executable software code used by the one or more processors 112 during operation.

In this illustrative embodiment, the block diagram schematic 102 also includes a communication circuit 116 that can be configured for wired or wireless communication with one or more other devices or networks. The networks can include a wide area network, a local area network, and/or personal area network. The communication circuit 116 may also utilize wireless technology for communication, such as, but are not limited to, peer-to-peer or ad hoc communications such as HomeRF, Bluetooth and IEEE 802.11 and other forms of wireless communication such as infrared technology. The communication circuit 116 can include wireless communication circuitry, one of a receiver, a transmitter, or transceiver, and one or more antennas.

In one embodiment, the one or more processors 112 can be responsible for performing the primary functions of the electronic device with which the block diagram schematic 102 is operational. For example, in one embodiment the one or more processors 112 comprise one or more circuits operable with the user interface 105 to present presentation information to a user. Additionally, the one or more processors 112 can be operable with the audio output 111 to deliver audio output to a user. The executable software code used by the one or more processors 112 can be configured as one or more modules 117 that are operable with the one or more processors 112. Such modules 117 can store instructions, control algorithms, and so forth.

In one or more embodiments, the block diagram schematic 102 includes an audio processor 118. In one or more embodiments, the audio processor 118 is operable to receive audio input from a source, such as a person or persons, who are situated within an environment 119 about the electronic device 100. The audio processor 118 can also receive audio input from the environment 119 as well. The audio processor 118 can include hardware, executable code, and speech monitor executable code in one embodiment.

In one embodiment, the audio processor 118 is configured to implement a voice control feature that allows the electronic device 100 to function as a voice assistant device, which is a digital assistant using voice recognition, speech synthesis, and natural language processing to receive audio input comprising a voice command from a source, determine the appropriate response to the voice command, and then deliver the response in the form of audio output in response to receiving the audio input from the source. When so configured, a user can speak commands to cause the one or more processors 112 of the electronic device 100 to execute a control operation. In one or more embodiments the audio processor 118 listens for voice commands, processes the commands and, in conjunction with the one or more processors 112, performs one or more control operations, such as delivering audio output, in response to receiving audio input.

Various sensors can be operable with the one or more processors 112. An imager processor system 120 can be included in the electronic device 100 and can be operable with the one or more processors 112. The imager processor system can include one or more sensors, which can include a front-facing camera or imager, a rear-facing camera or imager, or another imager. In one or more embodiments the one or more sensors operable with the imager processor system 120 comprise at least one or more of an imager 121, a depth imager 122, and one or more proximity sensors 123.

In one embodiment, the imager 121 comprises a two-dimensional imager configured to receive at least one image of a person or other objects within an environment 119 of the electronic device 100. In one embodiment, the imager 121 comprises a two-dimensional Red-Green-Blue (RGB) imager. In another embodiment, the imager 121 comprises an infrared imager. Other types of imagers suitable for use as the imager 121 of electronic device 100 will be obvious to those of ordinary skill in the art having the benefit of this disclosure.

Where included, the depth imager 122 can take a variety of forms. In a first embodiment, the depth imager 122 comprises a pair of imagers separated by a predetermined distance, such as three to four images. This "stereo" imager works in the same way the human eyes do in that it captures images from two different angles and reconciles the two to determine distance.

In another embodiment, the depth imager 122 employs a structured light laser. The structured light laser projects tiny light patterns that expand with distance. These patterns land on a surface, such as a user's face, and are then captured by an imager. By determining the location and spacing between the elements of the pattern, three-dimensional mapping can be obtained.

In still another embodiment, the depth imager 122 comprises a time of flight device. Time of flight three-dimensional sensors emit laser or infrared pulses from a photodiode array. These pulses reflect back from a surface, such as the user's face. The time it takes for pulses to move from the photodiode array to the surface and back determines distance, from which a three-dimensional mapping of a surface can be obtained. Regardless of embodiment, when included the depth imager 122 adds a third "z-dimension" to the x-dimension and y-dimension defining the two-dimensional image captured by the imager 121.

Where included, the proximity sensors 123 can be configured to detect objects proximately located with the display 101 or device housing 103 of the electronic device 100.

The proximity sensors can fall in to one of two camps: active proximity sensors that include a transmitter and receiver pair, and "passive" proximity sensors that include a receiver only. Either the proximity detector components or the proximity sensor components can be generally used for gesture control and other user interface protocols in one or more embodiments. Either the proximity detector components or the proximity sensor components can be generally used for distance determination, such as measuring distances between objects situated within the environment 119 of the electronic device and/or determining changes in distance between the electronic device 100 and objects situated within the environment 119.

As used herein, a "proximity sensor component" comprises a signal receiver only that does not include a corresponding transmitter to emit signals for reflection off an object to the signal receiver. A signal receiver only can be used due to the fact that an external source, such as the body of a person or other heat-generating object external to the electronic device 100, can serve as the transmitter. Illustrating by example, in one embodiment the proximity sensor components comprise only a signal receiver to receive signals from objects external to the device housing 103 of the electronic device 100. In one embodiment, the signal receiver is an infrared signal receiver to receive an infrared emission from a source, such as a human being, when the human being is approaching or near the electronic device 100.

Proximity sensor components are sometimes referred to as a "passive IR detectors" due to the fact that a person or other warm object serves as the active transmitter. Accordingly, the proximity sensor component requires no transmitter since objects disposed external to the housing deliver emissions that are received by the infrared receiver. As no transmitter is required, each proximity sensor component can operate at a very low power level.

In one embodiment, the signal receiver of each proximity sensor component can operate at various sensitivity levels so as to cause the at least one proximity sensor component to be operable to receive the infrared emissions from different distances. For example, the one or more processors 112 can cause each proximity sensor component to operate at a first "effective" sensitivity so as to receive infrared emissions from a first distance. Similarly, the one or more processors 112 can cause each proximity sensor component to operate at a second sensitivity, which is less than the first sensitivity, so as to receive infrared emissions from a second distance, which is less than the first distance. The sensitivity change can be effected by causing the one or more processors 112 to interpret readings from the proximity sensor component differently.

By contrast, "proximity detector components" include a signal emitter and a corresponding signal receiver, which constitute an "active" pair. While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers that define an active IR pair.

In one or more embodiments, each proximity detector component can be an infrared proximity sensor set that uses a signal emitter that transmits a beam of infrared light that reflects from a nearby object and is received by a corresponding signal receiver. Proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

In one embodiment when the imager processor system 120 detects a person, one or both of the imager 121 and/or the depth imager 122 can capture a photograph and/or depth scan of that person. The imager processor system 120 can then compare the image and/or depth scan to one or more predefined authentication references stored in the memory 115. This comparison, in one or more embodiments, is used to confirm beyond a threshold authenticity probability that the person's face—both in the image and the depth scan—sufficiently matches one or more of the predefined authentication references stored in the memory 115 to authenticate a person as an authorized user of the electronic device 100. Beneficially, this optical recognition performed by the imager processor system 120 can allow access to the electronic device 100 only when one of the persons detected about the electronic device 100 are sufficiently identified as an authorized user of the electronic device 100.

Other sensors 125 can be operable with the one or more processors 112 as well. Illustrating by example, in one or more embodiments the other sensors include a skin sensor is configured to determine when the electronic device 100 is touching the skin of a person. For example, in one or more embodiments the skin sensor can determine when the electronic device 100 is being held within the hand of a user. In one embodiment, the skin sensor can include a substrate with an electrode disposed thereon. The electrode can confirm the object touching the skin sensor is skin by detecting electrical signals generated by a heartbeat in one embodiment. Other forms of skin sensors will be obvious to those of ordinary skill in the art having the benefit of this disclosure.

The other sensors 125 can include a light sensor. The light sensor can be used to detect whether or not direct light is incident on the device housing 103 of the electronic device 100 in one or more embodiments. The light sensor can also be used to detect an intensity of ambient light is above or below a predefined threshold in one or more embodiments.

In one or more embodiments the light sensor can detect changes in optical intensity, color, light, or shadow in the near vicinity of the electronic device 100. This can be used to make inferences about whether the electronic device 100 is in a stowed state. If, for example, the light sensor detects low-light conditions, i.e., when the intensity of received ambient light is below a predefined threshold, this can indicate that the electronic device 100 is disposed within a pocket, drawer, or purse. In one embodiment, the light sensor can be configured as an image-sensing device that captures successive images about the device and compares luminous intensity, color, or other spatial variations between images to detect weather conditions.

The other sensors 125 can include a temperature sensor configured to monitor the temperature of the environment. The temperature sensor can take various forms. In one embodiment, the temperature sensor is simply a proximity sensor component. In another embodiment, the temperature sensor comprises a simple thermopile. In another embodiment, the temperature sensor comprises an infrared imager that captures the amount of thermal energy emitted by an object. Other types of temperature sensors will be obvious to those of ordinary skill in the art having the benefit of this disclosure.

The other sensors 125 can include a force sensor. The force sensor can take various forms. For example, in one embodiment, the force sensor comprises resistive switches or a force switch array configured to detect contact with one or both of the display 100 or the device housing 103 of the electronic device 100. In another embodiment, the force sensor can be capacitive. In yet another embodiment, piezoelectric sensors can be configured to sense force as well. Other types of force sensors will be obvious to those of ordinary skill in the art having the benefit of this disclosure.

The other sensors 125 can also include an audio input 110 comprising one or more microphones operable to receive acoustic input. While the one or more microphones can be used to sense voice input, voice commands, and other audio input, in one or more embodiments they can also be used as environmental sensors to sense environmental sounds such as rumpling of soft surfaces of textile materials or other similar materials encapsulating the electronic device 100 when the electronic device 100 is in a stowed state. Alternatively, the one or more microphones can be used to detect the nearby presence of items when the electronic device 100 is in a stowed state, such as coins, medications, grooming items, notecards, keys, lotions, notepads, lip balm, and other items that may be near the electronic device 100 when stowed in a container such as a purse.

The other sensors 125 can also include a moisture sensor. The moisture sensor can be configured to detect the amount of moisture on or about the display 101 or the device housing 103 of the electronic device 100. The moisture sensor can be realized in the form of an impedance sensor that measures impedance between electrodes. Other types of moisture sensors will be obvious to those of ordinary skill in the art having the benefit of this disclosure.

The other sensors 125 can include a distance measurement sensor. The distance measurement sensor can take various forms. In one or more embodiments, the distance measurement sensor comprises a time of flight depth imager, which can also be one form of depth imager 122 as described above. In another embodiment, the distance measurement sensor can comprise a radar device. In still another embodiment, the distance measurement sensor can comprise a sonar device. In yet another embodiment, the distance measurement sensor can comprise an ultrasound distance measurement device.

Regardless of type, in one or more embodiments the distance measurement sensor can perform distance determination operations. For example, the distance measurement sensor can measure distances between objects situated within the environment 119 of the electronic device 100 in one or more embodiments. In other embodiments, the distance measurement sensor can determine changes in distances between the electronic device 100 and objects situated within the environment 119. Combinations of these operations can be performed as well.

The electronic device 100 can include one or more motion sensors 124. The one or more motion sensors 124 can function as an orientation detector configured to determine a spatial orientation of the electronic device 100 in three-dimensional space. The one or more motion sensors 124 can include one or more accelerometers or gyroscopes. For example, an accelerometer may be embedded in the electronic circuitry of the electronic device 100 to show vertical orientation, constant tilt and/or whether the electronic device 100 is stationary. The measurement of tilt relative to gravity is referred to as "static acceleration," while the measurement of motion and/or vibration is referred to as "dynamic acceleration." A gyroscope can be used in a similar fashion.

In one or more embodiments, the one or more motion sensors 124 can detect motion of the electronic device (100). The one or more motion sensors 124 can be used to sense some of the gestures of a user as well. The one or more motion sensors 124 can be used to determine the spatial orientation of the electronic device (100) as well in three-dimensional space by detecting a gravitational direction. The one or more motion sensors 124 can also include an electronic compass to detect the spatial orientation of the electronic device (100) relative to the earth's magnetic field.

A context engine 126 can be operable with the other sensors 125 to detect, infer, capture, and otherwise determine persons and actions that are occurring in an environment 119 about the electronic device 100. For example, where included one embodiment of the context engine 126 determines assessed contexts and frameworks using adjustable algorithms of context assessment employing information, data, and events. These assessments may be learned through repetitive data analysis. Alternatively, a user may employ the user interface 105 to enter various parameters, constructs, rules, and/or paradigms that instruct or otherwise guide the context engine 126 in detecting stowed states of the electronic device 100, held states of the electronic device 100, multi-modal social cues, emotional states, moods, and other contextual information. The context engine 126 can comprise an artificial neural network or other similar technology in one or more embodiments.

In one or more embodiments, the context engine 126 is operable with the one or more processors 112. In some embodiments, the one or more processors 112 can control the context engine 126. In other embodiments, the context engine 126 can operate independently, delivering information gleaned from detecting stowed states of the electronic device 100, held states of the electronic device 100, multi-modal social cues, emotional states, moods, and other contextual information to the one or more processors 112. The context engine 126 can receive data from the other sensors 125. In one or more embodiments, the one or more processors 112 are configured to perform the operations of the context engine 126.

Other components 127 operable with the one or more processors 112 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as the one or more loudspeakers or other alarms and/or buzzers. The other components 127 can also include a mechanical output component such as vibrating or motion-based mechanisms.

In one or more embodiments, a status indicator 114 that is operable with the one or more processors 112. The status indicator 114 is operable to present a status identifier that is visible, audible, or both, to third parties. In the illustrative embodiment of FIG. 1, the status indicator output 140 is configured as a band along the perimeter of the display 101 that presents one of three colors 133,134,135 in a band about the perimeter of the display 101. In one or more embodiments, the three colors 133,134,135 comprise green, yellow, and red. These three colors 133,134,135 are illustrative only, as other colors will be obvious to those of ordinary skill in the art having the benefit of this disclosure. Moreover, while three colors 133,134,135 are used herein as an explanatory color set, in other embodiments the status indicator 114 will employ fewer than three colors 133,134,135. In still other embodiments, the status indicator 114 will employ more than three colors 133,134,135.

While color is one way of indicating a person's status that will be described for explanatory purposes below, the status indicator 114 can be configured to present information other than predefined colors as well. Illustrating by example, where the perimeter of the display 101 provides sufficient space, the status indicator 114 may present the words "DO NOT DISTURB" or other graphical indicia rather than color. This technique works particularly well with the electronic devices of FIGS. 3 and 4 below where the status indicator 114 presents status information along minor faces of the electronic device, which have more space than the perimeter of the display 101 in FIG. 1. Other examples of indicators for communicating the status of a user to third parties in addition to color will be obvious to those of ordinary skill in the art having the benefit of this disclosure.

In the illustrative embodiment of FIG. 1, the electronic device 100 is shown with the status indicator 114 in four different states 129,130,131,132. In a first state 129, the status indicator 114 is inactive. In a second state 130, the status indicator 114 is red. In a third state 131, the status indicator 114 is yellow. In a fourth state 132, the status indicator 114 is green.

In one or more embodiments, the status indicator 114 comprises a visible output device presenting a predefined color of the three colors 133,134,135 to indicate a status of an authorized user of the electronic device 100. Illustrating by example, when the status indicator 114 presents status indicator output 140 that is red, as shown at the second state 130, this indicates that the authorized user of the electronic device 100 does not wish to be disturbed. When the status indicator 114 presents status indicator output 140 that is yellow, as shown at the third state 131, this indicates that the authorized user of the electronic device 100 is occupied and is doing something, but does not mind being disturbed. When the status indicator 114 presents status indicator output 140 that is green, as shown at the fourth state 132, this indicates that the authorized user of the electronic device 100 is free and can be interrupted.

The benefits of including a status indicator 114 operable with the one or more processors 112 to present status identifications to people other than the authorized user of the electronic device 100 are numerous. First and foremost, the perimeter portion of the display 101 along which the status indicator output 140 is positioned in FIG. 1 is generally readily visible to others. Second, the status indicator output 140 of FIG. 1 requires very little power. Third, embodiments of the disclosure contemplate that the authorized user of the electronic device 100 likely does not want the information they are viewing on display 100 to be visible to others. Accordingly, the presentation of the status indicator output 140 along the perimeter of the display 101, as shown in FIG. 1, provides a good use for this additional space.

While using the perimeter of the display 101 for the status indicator output 140 as shown in FIG. 1 works well, embodiments of the disclosure contemplate that other forms of status indicators can be incorporated into electronic devices to provide the same function. Illustrating by example, turning now to FIG. 2, illustrated therein is another electronic device 200 configured in accordance with one or more embodiments of the disclosure.

Figure 2:
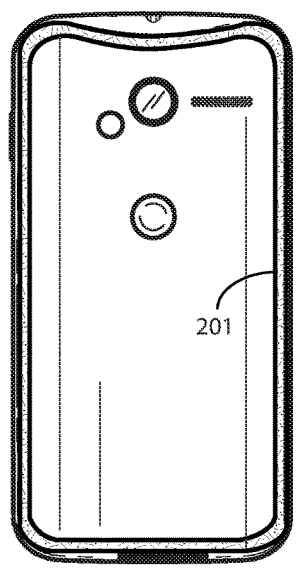
FIG. 2 illustrates another explanatory electronic device in accordance with one or more embodiments of the disclosure.

As shown in FIG. 2, the electronic device 200 includes one or more indicator bands 201 configured as a status indicator (114) for presenting the status of an authorized user of the electronic device 200 to third parties. The illustrative one or more indicator bands 201 of FIG. 2 are positioned on the rear major surface of the electronic device 200, along with an imager, light, control button, and loudspeaker port. However, in other embodiments the one or more indicator bands 201 can be positioned along the minor surfaces of the electronic device 200 instead of, or in addition to, the rear major surface. Additionally, while the one or more indicator bands 201 of FIG. 2 comprise a single, unitary indicator band, in other embodiments the one or more processors indicator bands 201 can comprise a plurality of indicator bands, whether positioned on the same major face of the electronic device 200 as the others or on different faces of the electronic device 200.

In one or more embodiments, the one or more indicator bands 201 comprise a semi-rigid polymer light pipe positioned above one or more light sources. In this illustrative embodiment, the semi-rigid polymer light pipe is centrally disposed along the rear surface of the housing of the electronic device 200.

In one or more embodiments, the semi-rigid polymer light pipe is manufactured from silicone. In one or more embodiments, the semi-rigid polymer light pipe is manufactured from translucent silicone. In one or more embodiments, the semi-rigid polymer light pipe is manufactured from uncolored, translucent silicone. However, in other embodiments the semi-rigid polymer light pipe can be manufactured from colored, translucent silicone as well.

Silicone is advantageous for constructing the semi-rigid polymer light pipe for a variety of reasons. First, silicone is semi-rigid. Second, it has a high frictional coefficient. Third, it is semi-compressible. Fourth, it can be made to be translucent, thereby serving as a light pipe. This configuration of the semi-rigid polymer light pipe allows the semi-rigid polymer light pipe to perform multiple functions. To wit, in addition to receiving, transporting, conducting, and/or redirecting received light, in one or more embodiments the semi-rigid polymer light pipe provides vibration isolation from supporting surfaces to enhance acoustic performance of microphones, loudspeakers, or other acoustic devices of the electronic device 200 when the electronic device 200 is positioned on a table or other flat surface with the display facing upward. Additionally, the semi-rigid polymer light pipe serves as a stand on a supporting surface that both prevents the electronic device 200 from sliding and that supports the electronic device above the supportive surface such that the exterior surface of the electronic device 200 and the supporting surface do not contact each other.

While silicone is one material suitable for manufacturing the semi-rigid polymer light pipe, other materials can be used as well. Illustrating by example, in another embodiment the semi-rigid polymer light pipe is manufactured form polyurethane. In still another embodiment, the semi-rigid polymer light pipe is manufactured from synthetic polyisoprene. In still another embodiment, the semi-rigid polymer light pipe is manufactured from nitrile. In still another embodiment, the semi-rigid polymer light pipe is manufactured from latex. Other materials suitable for manufacturing the semi-rigid polymer light pipe will be obvious to those of ordinary skill in the art having the benefit of this disclosure.

In this illustrative embodiment, the semi-rigid polymer light pipe comprises a continuous band disposed along the rear surface of the electronic device 200. By being a "continuous band," the semi-rigid polymer light pipe is manufactured as an annular ring defining a perimeter having an interior and an exterior, with the continuous loop itself having no beginning and no end. While being a continuous loop in this illustrative embodiment, embodiments of the disclosure are not so limited. In another embodiment the semi-rigid polymer light pipe can be manufactured as one or more linear or non-linear strips, one or more interlaced linear or non-linear strips, a matrix of linear or non-linear strips, or in other configurations.

In this illustrative embodiment, the semi-rigid polymer light pipe takes contours matching those of the electronic device 200. While this is one suitable shape for the semi-rigid polymer light pipe, the semi-rigid polymer light pipe can take other shapes as well. In another embodiment, the semi-rigid polymer light pipe is round. In another embodiment, the semi-rigid polymer light pipe is ovular. In another embodiment, the semi-rigid polymer light pipe is rectangular. In another embodiment, the semi-rigid polymer light pipe is polygonal. In another embodiment, the semi-rigid polymer light pipe is a free form shape. Still other shapes for the semi-rigid polymer light pipe will be obvious to those of ordinary skill in the art having the benefit of this disclosure.

In one or more embodiments at least a portion of the semi-rigid polymer light pipe extends distally beyond the rear surface of the electronic device 200. This results in a distal edge of the semi-rigid polymer light pipe being raised above the rear surface of the electronic device 200.

The fact that the distal edge of the semi-rigid polymer light pipe is raised above the rear surface of the electronic device 200 offers several advantages. First, it allows the semi-rigid polymer light pipe to serve as a stand for the electronic device 200. Second, it allows the semi-rigid polymer light pipe to provide vibrational isolation between the rear surface of the electronic device 200 and any supporting surface. This enhances the performance of audio output devices. Third, it allows the semi-rigid polymer light pipe to frictionally resist movement of the housing when the semi-rigid polymer light pipe is in contact with a supporting surface. Other advantages will be obvious to those of ordinary skill in the art having the benefit of this disclosure.

Figure 3:
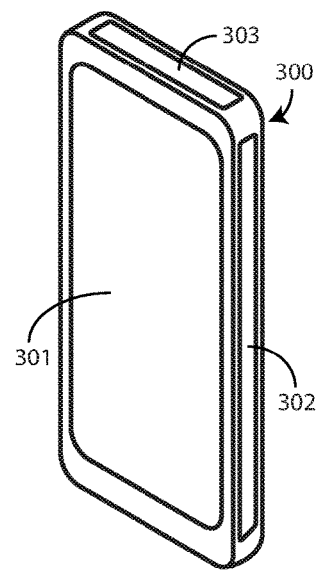
FIG. 3 illustrates still another explanatory electronic device in accordance with one or more embodiments of the disclosure.

Turning now to FIG. 3, in another embodiment an electronic device 300 includes one or more displays 302,303 positioned on minor faces of the device housing of the electronic device 300 in addition to the primary display 301 positioned on a major face of the electronic device 300. In one or more embodiments, these one or more displays 302,303 allow for the projection of color, text, or other visual indicia from the sides of the electronic device 300 so that those colors, text, or visual indicia can be seen by third parties.

Figure 4:
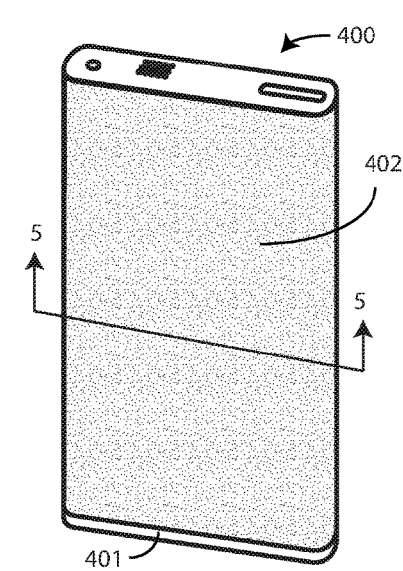
FIG. 4 illustrates yet another explanatory electronic device in accordance with one or more embodiments of the disclosure.

Turning now to FIG. 4, in still other embodiments an electronic device 400 is equipped with pre-formed display assembly 402 that spills along the minor faces of the electronic device 400. As shown in FIG. 4, the electronic device 400 includes a device housing 401 and a pre-formed display assembly 402. The pre-formed display assembly 402 is coupled to, and wraps around at least two sides of the device housing 401. The pre-formed display assembly 402 is unique in that it is a unitary display with contours that span and wrap about at least one minor surface of the device housing 401, while also spanning at least one major surface of the device housing 401. The electronic device 400 of FIG. 4 includes a pre-formed display assembly 402 that is continuous, unitary, and unbroken as it passes, for example, from one minor side, across a major surface, and then along another minor side.

Advantageously, the pre-formed display assembly 402 provides a desirable feature for electronic devices such as smartphones, tablet computers, laptop computers, and the like. In contrast to prior art electronic devices that have multiple displays with many elements, the electronic device 400 of FIG. 4, with its pre-formed display assembly 402, allows for, in one or more embodiments, the device housing 401 to be fully wrapped by the unitary, continuous, pre-formed display assembly 402. This pre-formed display assembly 402 can be referred to as a "waterfall" display because imagery presented on the pre-formed display assembly 402 spill from the major surfaces of the pre-formed display assembly 402 spanning the major surfaces of the device housing 401 to the curved contours of the pre-formed display assembly 402 spanning the minor surfaces of the device housing 401, thereby cascading about the device housing 401 like water going over a waterfall. In one or more embodiments these waterfall side portions can be used to present one or more user actuation targets defining one or more virtual buttons.

While the ability to present information along the minor faces of the electronic device 400 is incredible, embodiments of the disclosure also contemplate that some of this increased display surface area will frequently go unused. Illustrating by example, with the pre-formed display assembly 402 of FIG. 4 that wraps from a major face around minor faces positioned along the sides of a device housing 401, the authorized user of the electronic device 400 may not want personal information, data, or content to be presented along the minor surfaces of the device housing 401 due to the fact that it would be visible to third parties. However, embodiments of the disclosure take advantage of this additional display area and use it to present a status indicator (114) for the purpose of displaying a user status to nearby people.

Figure 5:
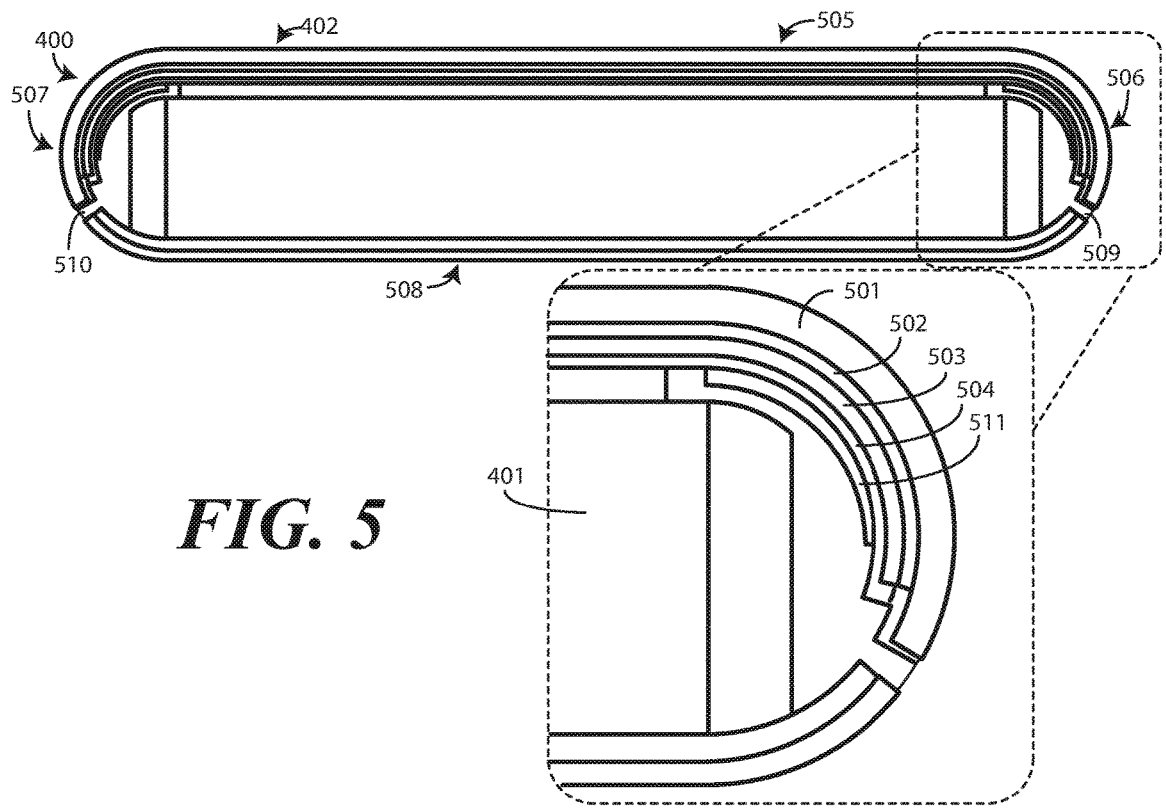
FIG. 5 illustrates a sectional view of the electronic device of FIG. 5.

Turning now to FIG. 5, illustrated therein is a view of the electronic device 400, including the pre-formed display assembly 402, shown in cross section, which allows the various components of the pre-formed display assembly 402 to be seen. In one or more embodiments, the electronic device 400 includes the device housing 401 and the pre-formed display assembly 402. As shown in FIG. 5, the pre-formed display assembly 402 wraps around at least two sides of the device housing 401. In this illustrative embodiment, the pre-formed display assembly 402 wraps not only around at least three sides of the device housing 401, but around three sides of the device housing 401.

As shown in FIG. 5, in one or more embodiments the pre-formed display assembly 402 comprises one or more layers that are coupled or laminated together to complete the pre-formed display assembly 402. In one or more embodiments, these layers comprise a unitary pre-formed fascia 501, a first adhesive layer 502, a flexible display 503, an optional second adhesive layer (not shown but would be like the first adhesive layer 502 but positioned on the interior surface of the flexible display 503), and an optional substrate 504. An optional third adhesive layer could be positioned between the optional substrate 504, where employed, or on the interior surface of the flexible display 503 to couple the pre-formed display assembly 402 to the device housing 401. Other configurations of layers suitable for manufacturing the pre-formed display assembly 402 will be obvious to those of ordinary skill in the art having the benefit of this disclosure.

Beginning from the top of the layer stack, in one or more embodiments the unitary pre-formed fascia 501 comprises an optically transparent substrate. In one or more embodiments the unitary pre-formed fascia 501 may be manufactured from an optically transparent material. This material can be any of a variety of materials. Examples include a thin film sheet of a thermoplastic material. Illustrating by example, in one embodiment the unitary pre-formed fascia 501 is manufactured from a layer of optically transparent polyamide. In another embodiment, the unitary pre-formed fascia 501 is manufactured from a layer of optically transparent polycarbonate.

In the illustrative embodiment of FIG. 5, the unitary pre-formed fascia 501 is manufactured from glass, and comprises a unitary pre-formed glass fascia. In one or more embodiments the unitary pre-formed glass fascia is manufactured from a chemically treated glass. The unitary pre-formed glass fascia can be strengthened using an ion exchange process. In such a process, the unitary pre-formed glass fascia can be placed into a high temperature salt bath where ions are introduced into the surface of the unitary pre-formed glass fascia, thereby strengthening the same. In one or more embodiments, the unitary pre-formed glass fascia has a thickness of between 0.3 millimeters and 0.6 millimeters. For instance, in one embodiment the unitary pre-formed glass fascia has a thickness of about 0.5 millimeters. Testing and simulation has demonstrated that where the unitary pre-formed glass fascia is so configured, it can be deformed by squeezing the sides of the electronic device 400, thereby compressing one or more gaps 509,510 defined by the unitary pre-formed glass fascia.

The unitary pre-formed glass fascia of FIG. 5 has an obround shape that includes a first major surface 505 and at least one arched bridging member. The unitary pre-formed glass fascia of FIG. 5 includes two arched bridging members, namely, a first arched bridging member 506 and a second arched bridging member 307. In one or more embodiments, one or more processors (112) of the electronic device 400 present the status indicator (114) along one or both of the first arched bridging member 506 and the second arched bridging member 507, while presenting content to an authorized user of the electronic device 400 along the first major surface 505 of the pre-formed display assembly 402.

In this illustrative embodiment, the first major surface 505 is substantially planar. In other embodiments, the first major surface 505 can include convex or concave contours rather than substantially planar ones. In the illustrative embodiment of FIG. 5, the first arched bridging member 506 and the second arched bridging member 507 each define a partially circular cross section across which a status indicator (114) can be presented. In other embodiments, the first arched bridging member 506 and the second arched bridging member 307 will have other curved contours across which a status indicator (114) can be presented.

In this illustrative embodiment, the first arched bridging member 506 is positioned about a first minor surface of the device housing 401. Since this unitary pre-formed glass fascia includes two arched bridging members, the second arched bridging member 507 is also positioned about a second minor surface of the device housing 401. Here, the first major surface 505 physically separates the first arched bridging member 506 and the second arched bridging member 507.

In one or more embodiments, the first arched bridging member 506 and the second arched bridging member 507 each terminate at a gap 509,510 situated between the unitary pre-formed glass fascia and a rear fascia 508 spanning the rear surface of the device housing 401. In one or more embodiments, the gap 509,510 runs the length of the unitary pre-formed glass fascia, which means that the gap 509,510 spans the length (into the page) of the unitary pre-formed glass fascia.

In one or more embodiments, when the unitary pre-formed fascia 501 is manufactured from glass to define a unitary pre-formed glass fascia, and where the glass is chemically strengthened, testing and simulation demonstrates that the glass can be deformed. Illustrating by example, in one or more embodiments a user can press either the first arched bridging member 506 or the second arched bridging member 507 to compress its respective gap 509, 510. In one or more embodiments, one or more piezoelectric sensors 511 can be positioned along the interior surface of the unitary pre-formed fascia 501 to detect this compression. Advantageously, this allows either the first arched bridging member 506 or the second arched bridging member 507 to be used as a switch, button, or other control mechanism.

Illustrating by example, in one or more embodiments an authorized user of the electronic device 400 can squeeze one or both of the first arched bridging member 506 or the second arched bridging member 507 toward the device housing 401 to actuate the status indicator (114). For instance, if the status indicator (114) is OFF, the authorized user of the electronic device 400 might squeeze the first arched bridging member 506 and the second arched bridging member 507 toward the device housing 401 to transition the status indicator (114) to the first state (130), thereby causing the first arched bridging member 506 and the second arched bridging member 507 to become red. If this is not the state (130) desired, the authorized user of the electronic device 400 could squeeze the first arched bridging member 506 and the second arched bridging member 507 toward the device housing 401 again to transition the status indicator (114) from the first state (130) to the second state (131), thereby causing the first arched bridging member 506 and the second arched bridging member 507 to become yellow. If this is not the state (131) desired, the authorized user of the electronic device 400 could squeeze the first arched bridging member 506 and the second arched bridging member 507 toward the device housing 401 a third time to transition the status indicator (114) from the second state (131) to the third state (132), thereby causing the first arched bridging member 506 and the second arched bridging member 507 to become green, and so forth.

Where, for example, the unitary pre-formed glass fascia is manufactured from chemically strengthened glass having a thickness of about half a millimeter, the first arched bridging member 506 and the second arched bridging member 507 can be compressed inward by loading forces, thereby compressing the gap 509,510, with the glass strain remaining well under one percent. Thus, in one or more embodiments the unitary pre-formed fascia 501 comprises a unitary pre-formed glass fascia where at least one of the first arched bridging member 506 or the second arched bridging member 307 is deformable relative to the first major surface 505 to compress at least one of gap 509 or gap 510. The one or more piezoelectric sensors 511 can detect this deflection. Where one or more user actuation targets defining one or more virtual buttons are presented on either the first arched bridging member 506 or the second arched bridging member 507, the location of the touch, as detected by the touch sensor (113), and the compression of the arched bridge member, functions as a control mechanism to control the status indicator (114) of the electronic device 400 in one or more embodiments.

In one or more embodiments the unitary pre-formed fascia 501 functions as a fascia by defining a cover for the flexible display 503. In one or more embodiments the unitary pre-formed fascia 501 is optically transparent, in that light can pass through the unitary pre-formed fascia 501 so that objects behind the unitary pre-formed fascia 501 can be distinctly seen. The unitary pre-formed fascia 501 may optionally include a ultra-violet barrier. Such a barrier can be useful in improving the visibility of flexible display 503 in one or more embodiments.

Beneath the unitary pre-formed fascia 501 is a first adhesive layer 502, which is coupled to the interior major surface of the unitary pre-formed fascia 501. In one or more embodiments, the first adhesive layer 502 comprises an optically transparent adhesive. Said differently, in one or more embodiments the first adhesive layer 502 comprises an optically pellucid adhesive layer coupling the flexible display 503 to the interior major surface of the unitary pre-formed fascia 501.

The optically transparent adhesive can be applied to two sides of a thin, optically transparent substrate such that the first adhesive layer 502 functions as an optically transparent layer having optically transparent adhesive on both sides. Where so configured, in one or more embodiments the first adhesive layer 502 has a thickness of about fifty microns. This optically transparent version of "double-sided tape" can then be spooled and applied between the unitary pre-formed fascia 501 and the flexible display 503 to couple the two together.

In other embodiments the first adhesive layer 502 will instead be applied between the unitary pre-formed fascia 501 and the flexible display 503 as an optically transparent liquid, gel, as a homogeneous adhesive layer, or in the form of another medium. Where so configured, the first adhesive layer 502 can optionally be cured by heat, ultraviolet light, or other techniques. Other examples of materials suitable for use as the first adhesive layer 502 will be obvious to those of ordinary skill in the art having the benefit of this disclosure. In one or more embodiments, the first adhesive layer 502 mechanically couples the flexible display 503 to the interior surfaces of the unitary pre-formed fascia 501.

In one or more embodiments, the flexible display 503 is coupled to the interior major surface of the unitary pre-formed fascia 501. In the illustrative embodiment of FIG. 5, the flexible display 503 is situated between the optional substrate 504 and the unitary pre-formed fascia 501. In other embodiments, a layer above the flexible display 503 can be configured with enough stiffness to make the optional substrate 504 unnecessary. For example, in an embodiment where the unitary pre-formed fascia 501 is manufactured from chemically strengthened glass as a unitary pre-formed glass fascia, the optional substrate 504 may be omitted.

The flexible display 503 can optionally be touch-sensitive. In one or more embodiments, the flexible display 503 is configured as an organic light emitting diode (OLED) display layer coupled to the a flexible substrate, which allows the flexible display 503 to bend in accordance with various bending radii defined by the unitary pre-formed fascia 501. For example, some embodiments allow bending radii of between thirty and six hundred millimeters. Other substrates allow bending radii of around five millimeters to provide a display that is foldable through active bending. Other displays can be configured to accommodate both bends and folds.

In one or more embodiments the flexible display 503 may be formed from multiple layers of flexible material such as flexible sheets of polymer or other materials. Illustrating by example, the flexible display 503 can include a layer of optically pellucid electrical conductors, a polarizer layer, one or more optically transparent substrates, and layers of electronic control circuitry such as thin film transistors to actuate pixels and one or more capacitors for energy storage. In one or more embodiments, the flexible display 503 has a thickness of about 530 microns.

In one or more embodiments, so as to be touch sensitive, the flexible display 503 includes a layer including one or more optically transparent electrodes. In one or more embodiments, the flexible display 503 includes an organic light emitting diode layer configured to present images and other information to a user. The organic light emitting diode layer can include one or more pixel structures arranged in an array, with each pixel structure comprising a plurality of electroluminescent elements such as organic light emitting diodes. These various layers can be coupled to one or more optically transparent substrates of the flexible display 503. Other layers suitable for inclusion with the flexible display 503 will be obvious to those of ordinary skill in the art having the benefit of this disclosure.

In one or more embodiments, where the optional substrate 504 is included, the flexible display 503 can be coupled to the optional substrate 504 by a second adhesive layer, which would be like the first adhesive layer 502, although not necessarily optically transparent, and would be situated between the optional substrate 504 and the flexible display 503. In one or more embodiments, to simplify manufacture, the second adhesive layer would be identical to the first adhesive layer 502, comprising an optically transparent adhesive. However, since the second adhesive layer is coupled between the flexible display 503 and the optional substrate 504, i.e., under the flexible display 503, an optically transparent adhesive is not a requirement. The second adhesive layer could be partially optically transparent or not optically transparent at all in other embodiments.

Regardless of whether the second adhesive layer is optically transparent, in one or more embodiments the adhesive of the second adhesive layer is applied to two sides of a thin, flexible substrate. Where so configured, in one or more embodiments the second adhesive layer has a thickness of about fifty microns. This extremely thin version of "double-sided tape" can then be spooled and applied between the flexible display 503 and the optional substrate 504 to couple the two together.

In other embodiments, as with the first adhesive layer 502, the second adhesive layer will instead be applied between the flexible display 503 and the foldable substrate as a liquid, gel, as a homogeneous layer, or in the form of another medium. Where so configured, the second adhesive layer can optionally be cured by heat, ultraviolet light, or other techniques. Other examples of materials suitable for use as the second adhesive layer will be obvious to those of ordinary skill in the art having the benefit of this disclosure.

Where included, the optional substrate 504 is coupled to the flexible display 503 and defines a mechanical support for the flexible display 503 due to the fact that the optional substrate 504 is the stiffest layer of the unitary pre-formed display assembly 402 other than the unitary pre-formed fascia 501. In one or more embodiments the optional substrate 504 is manufactured from stainless steel with a thickness of about forty microns. In another embodiment, the optional substrate 504 is manufactured from a flexible plastic. Other materials from which the optional substrate 504 can be manufactured will be obvious to those of ordinary skill in the art having the benefit of this disclosure.

A third optional layer can then be positioned between the device housing 401 and the optional substrate 504, where included, or the flexible display 503. In one or more embodiments, to simplify manufacture, the third adhesive layer would be identical to the first adhesive layer 502, comprising an optically transparent adhesive. However, since the third adhesive layer is coupled between the device housing 401 and the optional substrate 504, where included, or the flexible display 503, i.e., interior of the flexible display 503, an optically transparent adhesive is not a requirement. The third adhesive layer could be partially optically transparent or not optically transparent at all in other embodiments.

In the illustrative embodiment of FIG. 5, the unitary pre-formed fascia 501 wraps around at least two sides of the device housing 401. In this embodiment, the unitary pre-formed fascia 501 wraps around three sides of the device housing 401 due to the fact that the unitary pre-formed fascia 501 includes both a first arched bridging member 506 and a second arched bridging member 507. In other embodiments, the unitary pre-formed fascia 501 will include only one arched bridging member and will wrap about only two sides of the device housing 401.

It should be noted that the electronic devices of FIGS. 1-4 present only four examples of the myriad of ways in which a status indicator (114) could be presented to third parties. Numerous others will be obvious to those of ordinary skill in the art having the benefit of this disclosure.

Figure 6:
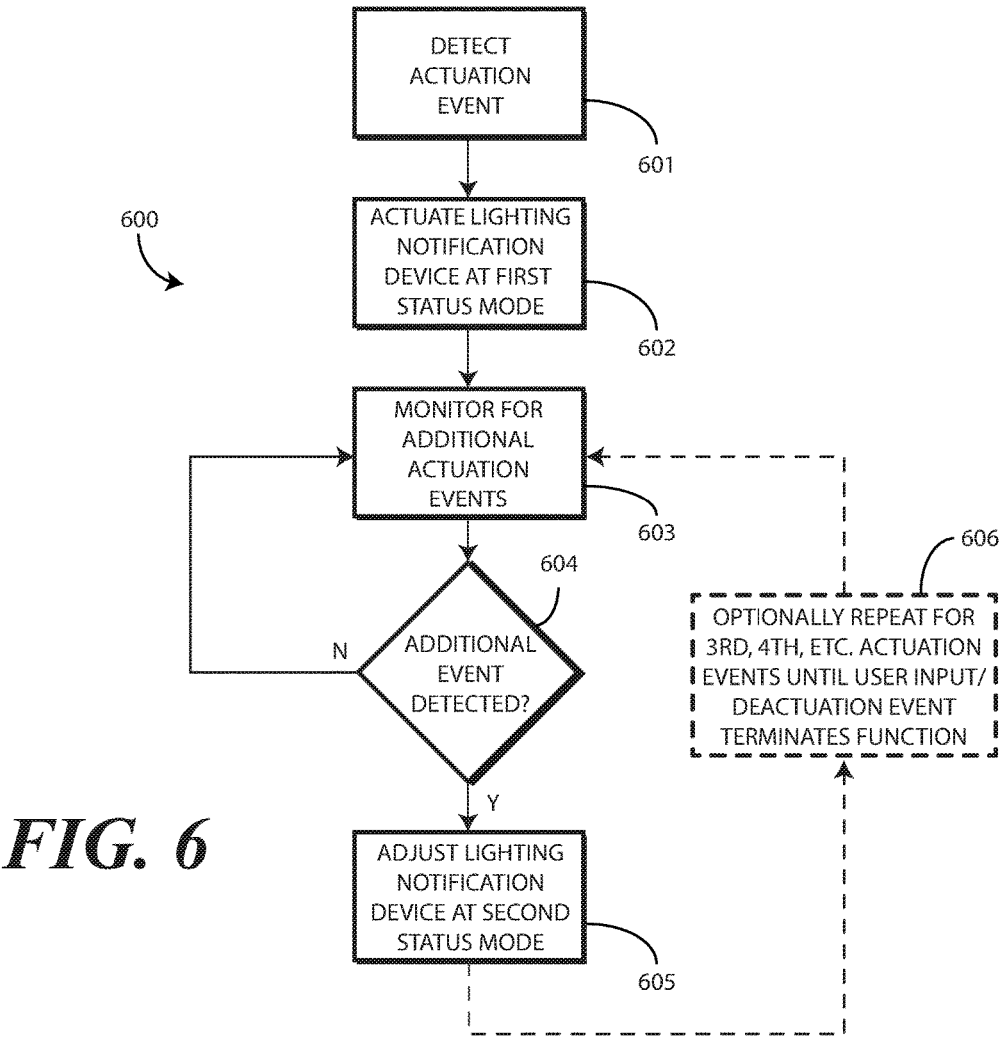
FIG. 6 illustrates one explanatory method in accordance with one or more embodiments of the disclosure.

Now that various hardware components have been described, attention will be turned to methods of using electronic devices in accordance with one or more embodiments of the disclosure. Turning now to FIG. 6, illustrated therein is one explanatory method 600 that can be used with any of the electronic devices of FIGS. 1-4 to present a status indicator output (140) to others indicating the status of the authorized user of the electronic device. In one or more embodiments, the "status" of the authorized user of the electronic device means an indication of whether the authorized user of the electronic device is willing to be disturbed. In this sense, the status indicator (114) acts like a virtual "do not disturb" sign for the electronic device. More detailed methods will be described thereafter with reference to subsequent figures.

Beginning at step 601, one or more sensors (125) of an electronic device (100,200,300,400) detect a first actuation event input. In one or more embodiments, the first actuation event input causes the actuation of the status indicator (114). In one or more embodiments, this actuation causes the status indicator (114) to transition from a first state (129), where the status indicator (114) is OFF, to a second state (130), where the status indicator (114) presents a first color, first text, first graphical indicia, or other information.

For example, as described above with reference to FIG. 1, in one or more embodiments the first actuation event input causes the status indicator (114) of the electronic device (100,200,300,400) to transition from a first state (129), where the status indicator (114) is OFF, to a second state (130), where the status indicator (114) projects red light from the electronic device (100,200,300,400). Accordingly, in one or more embodiments the actuation event input detected at step 601 may request that one or more processors (112) of the electronic device (100,200,300,400) cause a light source, operating in conjunction with the status indicator (114), and which may include a display, portion of a display, one or more light bands, or other device, to emit light of a predefined color as a status indicator status indicator output (140) to indicate the status of an authorized user of the electronic device (100,200,300,400) and, optionally, whether the authorized user of the electronic device (100,200,300,400) can be disturbed.

In one or more embodiments, a user delivers manual input to the electronic device (100,200,300,400) to deliver the actuation event input at step 601. Illustrating by example, the user may make a gesture translating the electronic device (100,200,300,400) in three-dimensional space to cause the status indicator to turn ON by transitioning to a first state (129). Accordingly, in one or more embodiments, the actuation event input detected at step 601 comprises a gesture input.

The gesture input can take a variety of forms. Illustrating by example, in one embodiment the gesture input comprises a hand or other object approaching the electronic device (100,200,300,400), as detected by the one or more proximity sensors (123), depth imager (122) or other sensors (125). In another embodiment, the gesture input comprises a user twisting the electronic device (100,200,300,400) about a major or minor axis in three-dimensional space, as detected by the motion sensor (124), imager (121), or other sensors (125).

In still another embodiment, the user can deliver the gesture input by moving a hand or arm in predefined motions in close proximity to the electronic device (100,200,300, 400), as detected by the one or more proximity sensors (123), the imager (121), the depth imager (122), or the other sensors (125). In yet another embodiment, the user can deliver gesture input by lifting, shaking, translating, or otherwise deliberately moving the electronic device (100) in three-dimensional space, as detected by the one or more motion sensors (124), imager (121), or other sensors (125). Other examples of actuation event inputs will be described below with reference to FIG. 8. Still others will be obvious to those of ordinary skill in the art having the benefit of this disclosure.

In one or more embodiments, the first actuation event input detected at step 601 comprises a gesture input translating the electronic device (100,200,300,400) back and forth in three-dimensional space. For example, the gesture input can translate the electronic device (100,200,300,400) in a chopping motion in the three-dimensional space. In so doing, the user can shake the electronic device (100,200, 300,400) up and down in a "chop chop" motion.

In one or more embodiments, this gesture input comprises a predefined gesture input associated with the status indicator (114) for actuation, operation, cessation of operation, and/or performance. Thus, the actuation event input detected at step 601 comprises a request for the status indicator (114) to cause the presentation of a predefined color at an output device in one or more embodiments.

The predefined mode of operation of the status indicator (114) can vary, just as does the actuation event input. Illustrating by example, in one embodiment the mode of operating the status indicator (114) comprises turning ON the status indicator (114). In another embodiment, the mode of operating the status indicator (114) comprises transitioning the status indicator (114) from one state to another, e.g., by transitioning the light being projected by the status indicator (114) from red to yellow, yellow to green, or green to OFF.

Thus, in one or more embodiments step 601 comprises an authorized user of the electronic device (100,200,300,400) user delivering manual input to the electronic device (100, 200,300,400) to actuate the status indicator (114), thereby causing the status indicator (114) to turn ON by transitioning to a first state (130). If the first state (130) is not the desired state, in one or more embodiments the user repeats the gesture, transitioning the status indicator (114) from one state to the next with each gesture, until state of the status indicator (114) is as desired. In one or more embodiments, the user can then turn the status indicator OFF by again repeating the gesture.

In one or more other embodiments, no manual input is required. Instead, the actuation event input received at step 601 comes from the one or more processors (112) of the electronic device (100,200,300,400), thereby causing operation of the status indicator (114) to occur automatically. Illustrating by example, in one or more embodiments one or more processors (112) of the electronic device (100,200, 300,400) are operable with a calendaring application. When an event scheduled in the calendaring application commences, the one or more processors (112) can deliver an actuation event input at step 601, thereby controlling the status indicator (114). When the event terminates, the one or more processors (112) can cause status indicator (114) to cease the presentation of status information pertaining to the authorized user of the electronic device (100,200,300,400). In one or more embodiments, the authorized user of the electronic device (100,200,300,400) can define, when creating the event in the calendaring application, in what state the status indicator (114) should operate while the event is in progress.

At step 602, the status indicator (114) actuates, performs, and/or operates the status indicator (114) in response to receiving the actuation event input at step 601. Using the three-color example set forth above, in one or more embodiments when a first "chop chop" motion of the electronic device (100,200,300,400) or calendaring event or incoming communication or other actuation event input is detected at step 601, at step 602 the one or more processors (112) cause the status indicator (114) turn ON, i.e., start and continue emitting light.

Thus, in one or more embodiments when the electronic device (100), using one or more sensors (125), detects the actuation event input at step 601, one or more processors (112) of the electronic device (100,200,300,400) can actuate, perform, and/or operate the status indicator (114) in response at step 602. Advantageously, this use of a actuation event input, one example of which is a gesture input translating the electronic device (100,200,300,400) in three-dimensional space, provides a natural, immediate, and intuitive method of controlling the electronic device (100,200, 300,400) without the necessity of delivering voice commands or touch input to the user interface (105) of the electronic device (100,200,300,400). Using the method 600 of FIG. 6, a user can trigger, activate, actuate, or initiate control features and functions and perform control operations via simple gesture motions to provide third parties with indications of whether the authorized user of the electronic device (100,200,300,400) is able to be disturbed.

In one or more embodiments, step 602 comprises the one or more processors (112) operating the status indicator (114) in a first state (130) in response to the first actuation event input received at step 601. Illustrating by example, in one or more embodiments step 602 comprises the one or more processors (112) causing the status indicator (114) to turn its status indicator output (140) red, thereby indicating that the authorized user of the electronic device (100,200,300,400) does not want to be disturbed.

Embodiments of the disclosure contemplate that when a actuation event input, such as a gesture motion translating the electronic device in a back and forth or chopping motion in three-dimensional space, a calendaring event, an incoming communication, or other actuation event input is detected at step 601, causes the one or more processors (112) to actuate and/or operate the status indicator (114), the initial state (130) of the status indicator (114) may not be the one desired by the authorized user of the electronic device (100,200,300,400). Accordingly, at step 603, the one or more sensors (125) of the electronic device (100,200,300, 400) continue to monitor for additional actuation event inputs. In one or more embodiments, step 603 occurs while the one or more processors (112) of the electronic device (100,200,300,400) are operating the status indicator (114) in the first state (130) at step 602. Thus, in the three-color example described above with reference to FIG. 1, step 603 occurs while the one or more processors (112) are operating the status indicator (114) in the first state (130) of being red, which is an indication that the authorized user of the electronic device (100,200,300,400) does not want to be disturbed in one or more embodiments.

Decision 604 then detects, with the one or more sensors (125) of the electronic device (100), whether a second actuation event input is detected while the status indicator (114) is operating in the first state (130). In one or more embodiments, when the one or more sensors (125) detect a second actuation event input at decision 604 while the status indicator (114) is operating in the first state (130), the one or more processors (112) transition the status indicator (114) from operating in the first state to a second state (131) at step 605. Accordingly, in one or more embodiments, step 605 comprises the one or more processors (112) of the electronic device (100) operating the status indicator (114) in a second state (131) in response to decision 604 detecting the second actuation event input, which turns the status indicator (114) from red to yellow, thereby indicating that the authorized user of the electronic device (100,200,300,400) is busy, but does not mind being disturbed. In one or more embodiments, the second state (131) of step 605 is different from the first state (130) at step 602.

In one or more embodiments, the second actuation event input and the first actuation event input are the same. Illustrating by example, the first actuation event input and the second actuation event input can each be "chop chop" motions translating the electronic device (100,200,300,400) back and forth in three-dimensional space. In other embodiments, the first actuation event input and the second actuation even input are different. For instance, the first actuation event input can be the "chop chop" motion, while the second actuation event input comprises a gesture twisting the electronic device (100) in three-dimensional space. Similarly, where the first actuation event input comprises the commencement of a calendared event in a calendar application operable with the one or more processors (112) of the electronic device (100,200,300,400), the second actuation event input can comprise the cessation of the calendared event, and so forth.

It should be noted that portions of the method 600 can repeat at step 606 for any desired number of iterations to provide increased granularity and resolution to the state changing process occurring at the status indicator (114). For example, using a scale of "one to four" for differences in state, in a first iteration of the method 600 step 602 may comprise operating the status indicator (114) in a first state (130) in response to a first actuation event input, thereby turning the status indicator (114) on and transitioning it to a red color, which indicates that an authorized user of the electronic device (100,200,300,400) does not want to be disturbed. In this first iteration of the method 600, step 605 may comprise transitioning operation of the status indicator (114) to a second state (131), which makes the status indicator (114) turn yellow, thereby indicating that the authorized user of the electronic device (100,200,300,400) is busy, but does not mind being disturbed in response to detecting the second actuation event input occurring while the status indicator (114) is operating in the first state.

At step 606, the method 600 can include transitioning operation of the status indicator (114) to a third state (132), which transitions the color of the status indicator (114) from yellow to green, thereby indicating that the authorized user of the electronic device (100,200,300,400) is free and can be disturbed in response to detecting a third actuation event input occurring while the status indicator (114) is operating in the second state (131). Thereafter, at step 605, the method 600 can include transitioning operation of the status indicator (114) back to the first state (129), where the status indicator (114) is presenting no color and is instead OFF. In one or more embodiments this occurs in response to detecting a fourth actuation event input occurring while the status indicator (114) is operating in the third state (132), and so forth. In one or more embodiments where there are more than four states, this process can repeat until the final state is reached, e.g., a ten on the scale of one to ten for example. Alternatively, the method 600 can terminate at step 606 when user input is received terminating the status indicator (114).

Figure 8:
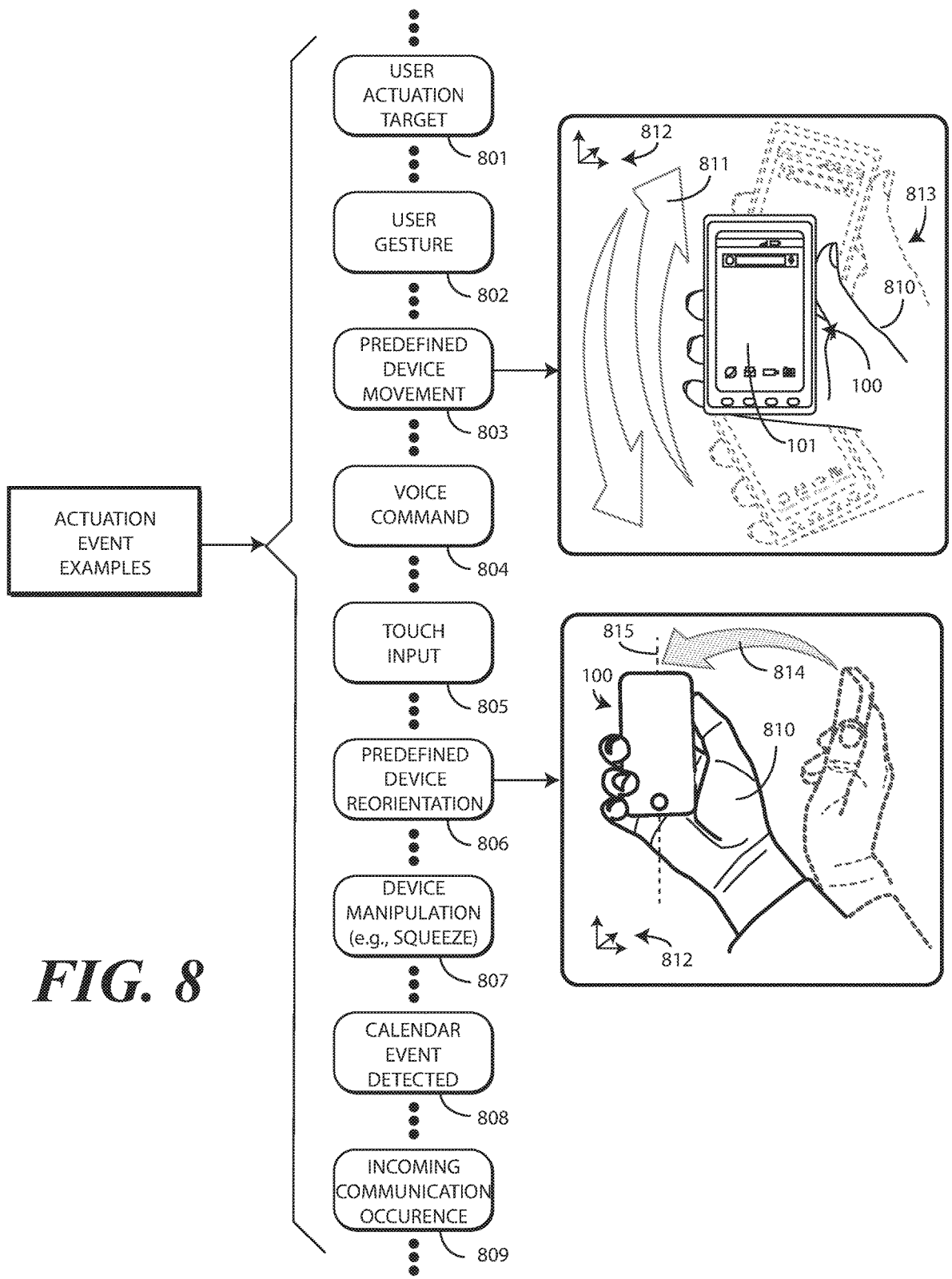
FIG. 8 illustrates examples of one or more actuation events triggering the presentation of a status indicator on an electronic device in accordance with one or more embodiments of the disclosure.

Turning now to FIG. 8, illustrated therein are various actuation event inputs that can be used as one or both of the first actuation event input, the second actuation event input, and optionally the third or more actuation event input of FIG. 6. It should be noted that the first actuation event input and the second actuation event input (and/or additional actuation event inputs) can be the same actuation event input or different actuation event inputs. For example, where step (602) of FIG. 6 above comprises detecting a "chop chop" motion to actuate and/or operate the status indicator (114) in the first state (130), step (605) could comprise transitioning the status indicator (114) from the first state (130) to the second state (131) in response to detecting another "chop chop" motion while the status indicator (114) is operating in the first state (130).

Figure 7:
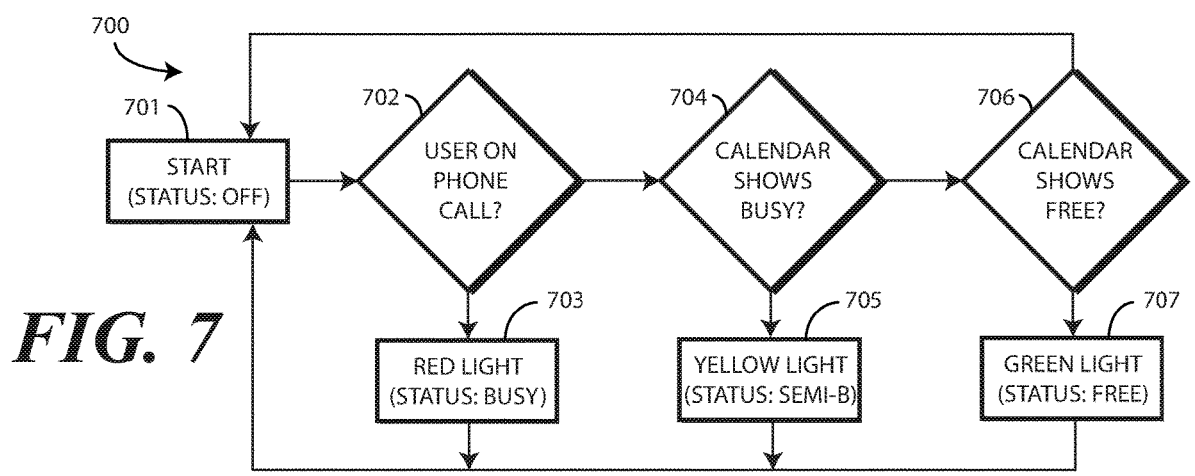
FIG. 7 illustrates another explanatory method in accordance with one or more embodiments of the disclosure.

In other embodiments, however, the first actuation event input and the second actuation event input can be different. For instance, where step (602) of FIG. 6 above comprises detecting a "chop chop" motion to actuate and/or operate the status indicator (114) in the first state (130), step (605) could comprise transitioning the status indicator (114) from the first state (130) to the second state (131) in response to detecting another gesture twisting the electronic device (100,200,300,400) in three-dimensional space while the status indicator (114) is operating in the first state (130), and so forth.

Where three or more actuation event inputs are employed, they can all be the same, all be different, or may alternate in predefined patterns. For instance, where step (602) of FIG. 6 above comprises detecting a "chop chop" motion to actuate and/or operate the status indicator (114) in the first state (130), and step (605) comprises transitioning the status indicator (114) from the first state (130) to the second state (131) in response to detecting another gesture twisting the electronic device (100,200,300,400) in three-dimensional space while the status indicator (114) is operating in the first state (130), a third actuation event input detected at step (606) in the form of another "chop chop" may cause the status indicator (114) to terminate operation. Alternatively, a third actuation event input detected at step (606) in the form of moving the electronic device (100,200,300,400) in spinning motion about a minor axis of the electronic device (100,200,300,400) may cause the status indicator (114) to transition to a third state (132), thereby causing the status indicator (114) to turn green so as to indicate that the authorized user of the electronic device (100,200,300,400) is not busy and can be interrupted, and so forth. Thus, it is to be understood that the actuation event inputs illustrated in FIG. 8 can be used in various combinations. FIG. 7, described below, will present one explanatory method (700) demonstrating how the actuation event inputs can be used in combination. Moreover, the list of actuation event inputs shown in FIG. 8 is illustrative only, as numerous others will be obvious to those of ordinary skill in the art having the benefit of this disclosure.

A first example of an actuation event input is user manipulation of a user actuation target 801 at a user interface (105) of an electronic device 100,(200,300,400). In one or more embodiments, when a status indicator (114) becomes active, one or more user actuation targets are presented on a display 101 of an electronic device 100,(200,300,400) or other touch sensitive surface. In one or more embodiments, a user 810 can deliver touch or other forms of user input to the user actuation target to cause one or both of the one or more processors (112) of the electronic device 100,(200,300,400) to actuate and/or operate the status indicator (114) in a first state (where the manipulation of the user actuation target 801 is used as a first actuation event input) and/or cause the one or more processors (112) of the electronic device 100,(200,300,400) to transition operation of the status indicator (114) from the first state to a second (or higher) state (where the manipulation of the user actuation target 801 is used as a second actuation event input) upon the one or more sensors (125) of the electronic device 100,(200,300,400) detecting the manipulation of the user actuation target 801 while the one or more processors (112) operate the user interface component in the first (or higher) state.

As described above with reference to FIG. 1, a second example of an actuation event input is that of a user gesture 802. The user gesture 802 could be a gesture made about the electronic device 100,(200,300,400), such as waving a hand above the electronic device 100,(200,300,400) as detected by the one or more proximity sensors (123), the imager (121), the depth imager (122), or other sensors (125) in one or more embodiments. The user gesture 802 could comprise moving a hand or other object toward, or away from, the electronic device 100,(200,300,400) as detected by the one or more proximity sensors (123), the imager (121), the depth imager (122), or other sensors (125) in one or more embodiments. Other forms of user gestures 802 will be obvious to those of ordinary skill in the art having the benefit of this disclosure.

In other embodiments, the actuation event input comprises a predefined movement 803 of the electronic device 100,(200,300,400) in three-dimensional space 812. In one or more embodiments, one or both of the first actuation event input or the second actuation event input comprise gesture inputs translating the electronic device 100,(200,300,400) in three-dimensional space 812 in accordance with a predefined movement 803.

For instance, the predefined movement 803 can translate or otherwise move the electronic device 100,(200,300,400) in a predefined motion in three-dimensional space 812. Illustrating by example, in one or more embodiments a user 810 can translate 811 the electronic device 100,(200,300,400) back and forth in three-dimensional space 812. As shown in this example, the user 810 is translating 811 the electronic device 100,(200,300,400) in a chopping motion 813 in three-dimensional space 812. Other predefined movements 803 translating or moving the electronic device 100,(200,300,400) in three-dimensional space 812 will be obvious to those of ordinary skill in the art having the benefit of this disclosure.

Another example of an actuation event input comprises a voice command 804. The user 810 may deliver a voice command 804 such as "turn on do not disturb" to cause the one or more processors (112) of the electronic device

100,(200,300,400) to actuate and/or operate the status indicator (114) in a first state. Similarly, the user 810 may use another voice command 804 such as "tell people I'm busy but don't mind interruption" or "turn from red to yellow" to cause the one or more processors (112) of the electronic device 100,(200,300,400) to transition operation of the status indicator (114) from the first state to a second (or higher) state upon the audio input (110) the electronic device 100,(200,300,400) detecting this voice command 804 while the one or more processors (112) operate the user interface component in the first (or higher) state, and so forth. Other examples of voice commands 804 will be obvious to those of ordinary skill in the art having the benefit of this disclosure.

Still another example of an actuation event input is touch input 805. In one or more embodiments, a user 810 may deliver touch input 805 in the form of a tap, double-tap, slide, twist, or grasp to cause the status indicator (114) respond. Illustrating by example, the user 810 may double-tap a touch-sensitive surface or the display 101 of the electronic device 100,(200,300,400) to cause the one or more processors (112) of the electronic device 100,(200,300,400) to actuate and/or operate the status indicator (114) in a first state. Similarly, the user 810 may slide a finger along the touch-sensitive surface or display 101 to cause the one or more processors (112) of the electronic device 100,(200,300,400) to transition operation of the status indicator (114) from the first state to a second (or higher) state upon the touch-sensitive surface or display 101 of the electronic device 100,(200,300,400) while the one or more processors (112) operate the status indicator (114) in the first (or higher) state, and so forth. Other examples of touch input 805 will be obvious to those of ordinary skill in the art having the benefit of this disclosure.

Yet another example of an actuation event input comprises a predefined rotation 806 of the electronic device 100,(200,300,400). The predefined rotation 806 can comprise a predefined twist, pivot, or other rotation of the electronic device 100,(200,300,400). In one or more embodiments, one or both of the first actuation event input or the second actuation event input comprise gesture inputs twisting, pivoting, or otherwise rotating the electronic device 100,(200,300,400) in three-dimensional space 812 in accordance with a predefined rotation 806.

Illustrating by example, in one or more embodiments the user 810 can twist 814 the electronic device 100,(200,300,400) in three-dimensional space about a major axis 815 of the electronic device 100,(200,300,400). Other examples of predefined rotations 806 suitable for use as an actuation event input will be obvious to those of ordinary skill in the art having the benefit of this disclosure.

Still another example of an actuation event input comprises a device manipulation 807. Recall from above that in one or more embodiments an electronic device (400) can be configured with a first arched bridging member (506) and a second arched bridging member (507) that can be compressed toward a device housing (401) to actuate a piezoelectric sensor (511). In such embodiments, device manipulation 807, such as squeezing the first arched bridging member (506) and/or second arched bridging member (507) toward the device housing (401) can define an actuation event input.

Thus, to illustrate by example, the user 810 may cause the one or more processors (112) to transition the status indicator (114) to the first state by performing the "chop chop" motion 813, but may cause the one or more processors (112) to transition the status indicator (114) to the second (or higher) state by squeezing the first arched bridging member (506) or second arched bridging member (507) toward the device housing (401) while the one or more processors (112) are operating the status indicator (114) in the first state, and so forth.

Still another example of an actuation event input is a calendar event 808 scheduled in a calendaring application operable with the one or more processors (112) of the electronic device 100,(200,300,400). Illustrating by example, when an event scheduled in the calendaring application commences, the one or more processors (112) can cause the status indicator (114) to transition to a busy state by presenting either red or yellow light. When the event terminates, the one or more processors (112) can cause the status indicator (114) to transition to an interruptible state by presenting either yellow or green light. In one or more embodiments, a user can define, when creating the event in the calendaring application, which state of the status indicator (114) should occur while the event is in progress.

Still another example of an actuation event input comprises an incoming communication occurrence 809. In one or more embodiments, when an incoming call is received, the one or more processors (112) can cause the status indicator (114) to transition to a busy state by presenting either red or yellow light. When the incoming call terminates, the one or more processors (112) can cause the status indicator (114) to transition to an interruptible state by presenting either yellow or green light. In one or more embodiments, a user can define what state of the status indicator (114) should occur while the communication is in progress. Illustrating by example, text messages may cause the status indicator (114) to emit yellow light, while phone calls cause the status indicator (114) to emit red light. When no incoming communication is occurring, the status indicator (114) may present green light while operational, and so forth.

It should be noted that the various actuation event inputs can be used in combination. Turning now to FIG. 7, illustrated therein is one method 700 demonstrating how this can occur.

The method 700 begins at step 701 where the status indicator (114) is initially OFF. As noted above, the authorized user of the electronic device can actuate the status indicator (114) manually in one or more embodiments. However, in other embodiments actuation of the status indicator (114) occurs automatically. The method 700 of FIG. 7 illustrates one such automatic method.

Decision 702 determines whether an incoming communication occurrence (809), such as an incoming phone call, is happening. Where it is, in one or more embodiments the method 700 moves to step 703 where the status indicator (114) transitions to a busy state. In one or more embodiments, the status indicator (114) presents red light in the busy state, thereby indicating that the authorized user of the electronic device does not want to be disturbed.

Where decision 702 determines that no incoming communication occurrence (809) is occurring, decision 704 determines whether a calendar event (808) is occurring. Where it is, in one or more embodiments the method 700 moves to step 705 where the status indicator (114) transitions to a semi-busy state. In one or more embodiments, the status indicator (114) presents yellow light in the semi-busy state, thereby indicating that the authorized user of the electronic device is busy, but can be disturbed if necessary.

Where decision 704 determines that a calendar event (808) is occurring, decision 706 determines whether the calendar event (808) has ended. Where it has, in one or more embodiments the method 700 moves to step 707 where the status indicator (114) transitions to a free state. In one or more embodiments, the status indicator (114) presents green light in the free state, thereby indicating that the authorized user of the electronic device is free for any and all shenanigans. Alternatively, where decision 704 determines that no calendar event (808) is occurring, decision 706 simply sends the method to step 707, where the method 700 can repeat thereafter.

Figure 9:
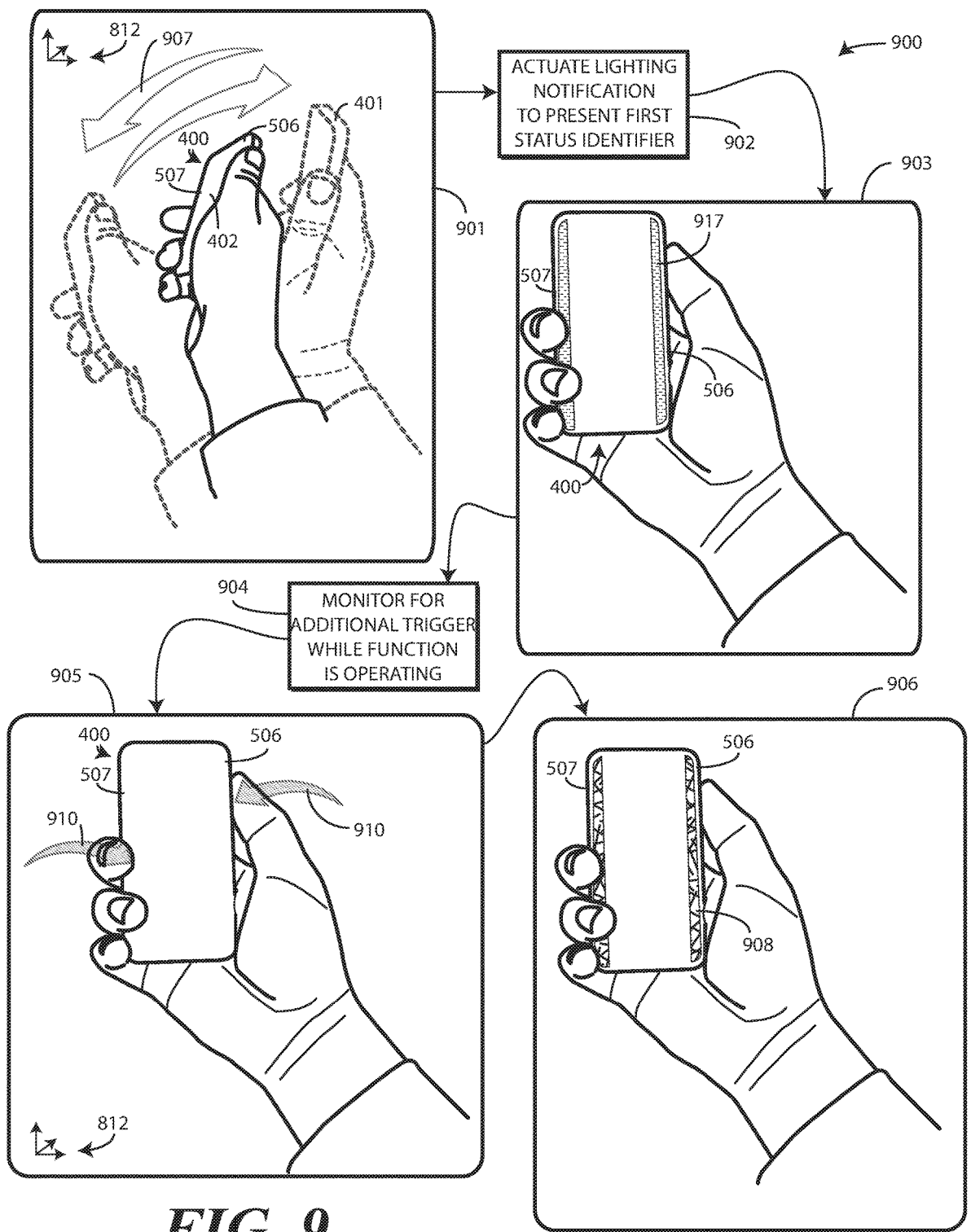
FIG. 9 illustrates another method in accordance with one or more embodiments of the disclosure.

Turning now to FIG. 9, illustrated therein is a method 900 of using one or more of the actuation event inputs described above with reference to FIG. 8 in accordance with one or more embodiments of the disclosure. In the example illustrated in FIG. 9, an electronic device 100 is equipped with a status indicator (114). In this illustrative example, the status indicator (114) can be OFF, red (indicating busy), yellow (indicating semi-busy), or green (indicating free).

In the method 900 of FIG. 9, two illustrative actuation event inputs have been selected from FIG. 8, namely, the predefined device movement (803) and the predefined device manipulation (807). These are explanatory only. As noted above, any of the trigger inputs described above with reference to FIG. 8 could be used alone or in combination.

At step 901, one or more sensors (125) of an electronic device 400 that includes a pre-formed display assembly 402 having a first arched bridging member 506 and a second arched bridging member 507 wrapping about the sides of the device housing 401 detect a major axis (815) of the electronic device 100 moving in a chopping motion 907 in three-dimensional space 812. At step 902, one or more processors (112) of the electronic device 400 operable with the one or more sensors (125) cause the status indicator (114) to present red light 917 in the forms of bands presented along the first arched bridging member 506 and the second arched bridging member 507. As shown at step 903, this results the first arched bridging member 506 and the second arched bridging member 507 turning red.

At step 904, the one or more processors (112) of the electronic device 400 monitor for another actuation event input while the status indicator (114) causes the first arched bridging member 506 and the second arched bridging member 507 to be red. At step 905, the one or more processors (112) detect, using the one or more sensors (125) of the electronic device 400, the first arched bridging member 506 and the second arched bridging member 507 of the electronic device 400 being squeezed 910 toward the device housing 401.

At step 906, in response to the one or more sensors (125) detecting that the first arched bridging member 506 and the second arched bridging member 507 are being squeezed at step 905, the one or more processors (112) cause the status indicator (114) to transition to the free state, thereby presenting green bands 908 along the first arched bridging member 506 and the second arched bridging member 507. This results in the status indicator (114) transitioning from a busy state to a free state. It should be noted that the transition between the busy state of step 903 to the free state of step 906 in response to detecting the second actuation event input at step 905 while the status indicator (114) was operating in the first state can occur instantaneously in response to a step input or gradually across a predefined amount of time.

Figure 10:
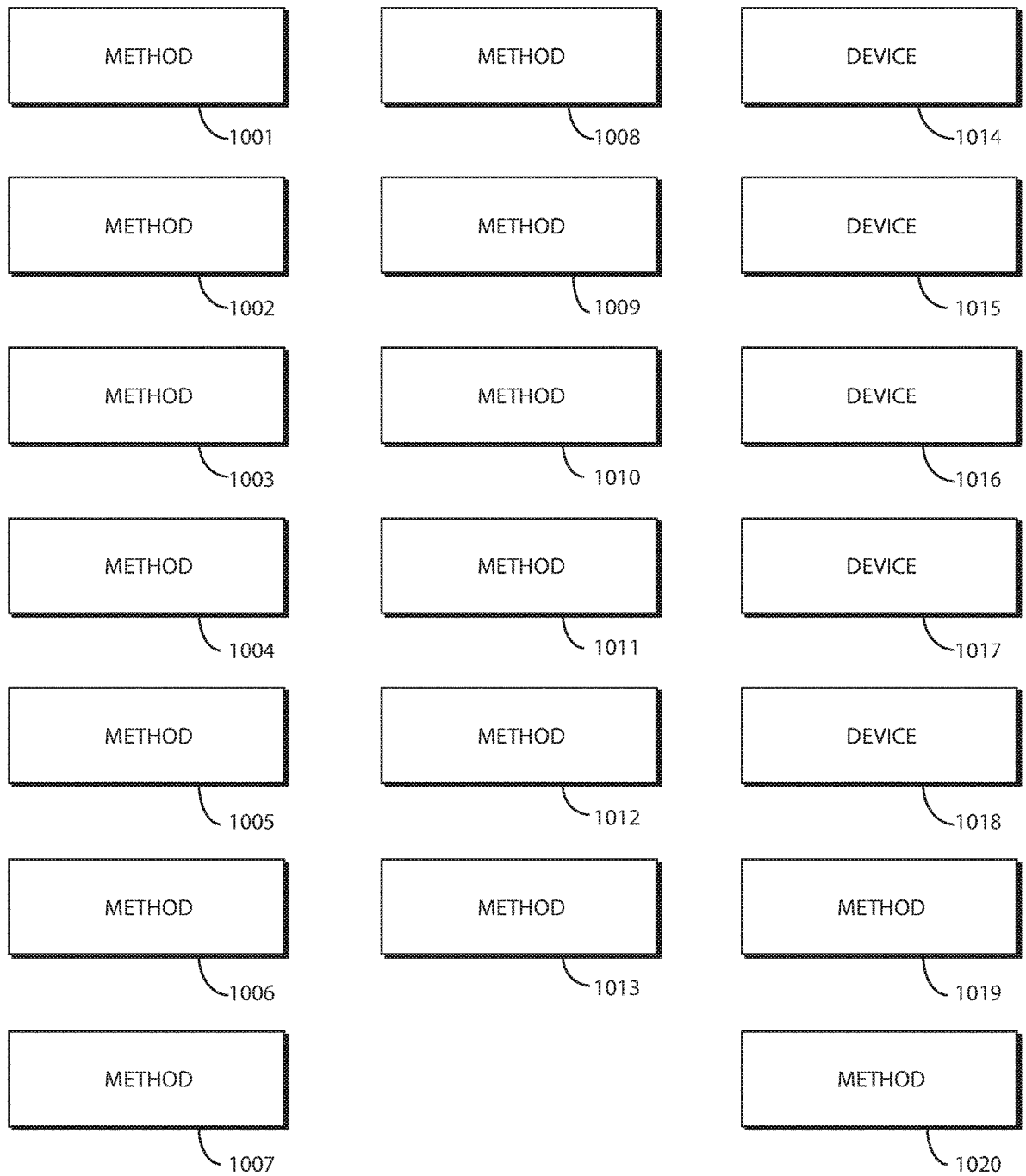
FIG. 10 illustrates various embodiments of the disclosure.

Turning now to FIG. 10, illustrated therein are various embodiments of the disclosure. The embodiments of FIG. 10 are shown as labeled boxes in FIG. 10 due to the fact that the individual components of these embodiments have been illustrated in detail in FIGS. 1-9, which precede FIG. 10. Accordingly, since these items have previously been illustrated and described, their repeated illustration is no longer essential for a proper understanding of these embodiments. Thus, the embodiments are shown as labeled boxes.

At 1001, a method in an electronic device comprises detecting, with one or more sensors of the electronic device, a first actuation event input requesting performance of a status indicator. At 1001, the method comprises operating, by one or more processors operable with the one or more sensors, the status indicator in a first state in response to the first actuation event input.

At 1001, the method comprises detecting, with the one or more sensors, a second actuation event input while the status indicator is operating in the first state. At 1001, the method comprises, in response to the detecting the second actuation event input, operating, by the one or more processors, the status indicator in a second state that is different from the first state.

At 1002, the first state and the second state of 1001 identify a status function indicating a status of an authorized user of the electronic device. At 1003, the status indicator of 1001 emits red light when operating in the first state. At 1004, the status indicator of 1003 causes the emission of light to occur from a first arched bridging member and a second arched bridging member of a pre-formed display assembly spanning a major face and at least two minor faces of a device housing of the electronic device when operating in the first state. At 1005, the status indicator of 1003 emits yellow light when operating in the second state.

At 1006, the method of 1005 further comprises detecting, with the one or more sensors, a third actuation event input while the status indicator is operating in the second state. At 1006, the method of 1005 further comprises, in response to the detecting the third actuation event input, operating, by the one or more processors, the status indicator in a third state that is different from either the first state or the second state. At 1007, the status indicator of 1006 emits green light when operating in the third state.

At 1008, the first actuation event input of 1001 comprises a gesture input translating the electronic device back and forth in three-dimensional space. At 1009, the gesture input of 1008 translates the electronic device in a chopping motion in the three-dimensional space.

At 1010, the first actuation event input of 1001 comprises commencement of a calendar event in a calendaring application operable with the one or more processors. At 1011, the first actuation event input of 1001 comprises compression of one or both of a first arched bridging member and a second arched bridging member of a pre-formed display assembly spanning a major face and at least two minor faces of a device housing of the electronic device toward the device housing.

At 1012, the first actuation event input and the second actuation event input of 1001 are different. At 1013, the first actuation event input of 1012 comprises an incoming communication event, while the second actuation event input of 1012 comprises a calendar event in a calendaring application operable with the one or more processors.

At 1014, an electronic device comprises one or more sensors and one or more processors operable with the one or more sensors. At 1014, the electronic device comprises a status indicator operable with the one or more processors in at least a first state and a second state that is different from the first state. At 1014, the one or more processors operate the status indicator in the first state in response to a first actuation event input and transition operation of the status indicator from the first state to the second state upon the one or more sensors detecting a second actuation event input occurring while the one or more processors operate the status indicator in the first state.

At 1015, the first state and the second state of 1014 identify a status function indicating a status of an authorized user of the electronic device. At 1016, the first actuation event input of 1015 is different from the second actuation event input.

At 1017, one or both of the first actuation event input and the second actuation event input of 1016 comprise gesture inputs translating the electronic device in three-dimensional space. At 1018, the first state of 1013 comprises a presentation of red light, while the second state comprises the presentation of green light.

At 1019, a method in an electronic device comprises detecting, with one or more sensors of the electronic device, a major axis of the electronic device moving in a chopping motion in three-dimensional space. At 1019, the method comprises causing, by one or more processors operable with the one or more sensors, a status indicator to operate in a first state.

At 1019, the method comprises detecting, by the one or more sensors, the electronic device again moving in another chopping motion in the three-dimensional space while the status indicator is operating in the first state. At 1019, the method comprises, in response to the one or more sensors detecting the electronic device again moving in the other chopping motion in the three-dimensional space, causing, by the one or more processors, the status indicator to operate in a second state. At 1019, the first state indicates an authorized user of the electronic device is busy and the second state indicates the authorized user of the electronic device is free.

At 1020, the first state of 1019 comprises the emission of red light by one or both of a first arched bridging member and a second arched bridging member of a pre-formed display assembly comprising a unitary pre-formed glass fascia spanning at least three sides of the electronic device. At 1020, the second state of 1019 comprises the emission of green light by the one or both of the first arched bridging member and the second arched bridging member.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
    detecting, with one or more sensors of the electronic device, a first actuation event input requesting performance of a status indicator configured as a band presented by a display on a perimeter portion of the display of the electronic device and circumscribing any other content presented on the display of the electronic device;
    operating, by one or more processors operable with the one or more sensors, the status indicator in a first state in response to the first actuation event input;
    detecting, with the one or more sensors, a second actuation event input while the status indicator is operating in the first state; and
    in response to the detecting the second actuation event input, operating, by the one or more processors, the status indicator in a second state that is different from the first state;
    the first state and the second state identifying a status function indicating a status of an authorized user of the electronic device, wherein the first state of the status indicator indicates the authorized user of the electronic device is busy and the second state of the status indicator indicates the authorized user of the electronic device is free.

2. The method of claim 1, the status indicator presenting the words "do not disturb" when operating in the first state.

3. The method of claim 1, the status indicator emitting red light when operating in the first state.

4. The method of claim 1, the status indicator comprising a single band passing along the perimeter portion of the display.

5. The method of claim 1, the status indicator emitting yellow light when operating in the second state.

6. The method of claim 1, further comprising:
    detecting, with the one or more sensors, a third actuation event input while the status indicator is operating in the second state; and
    in response to the detecting the third actuation event input, operating, by the one or more processors, the status indicator in a third state that is different from either the first state or the second state.

7. The method of claim 6, the status indicator emitting green light when operating in the third state.

8. The method of claim 1, the first actuation event input comprising a gesture input translating the electronic device back and forth in three-dimensional space.

9. The method of claim 8, the gesture input translating the electronic device in a chopping motion in the three-dimensional space.

10. The method of claim 1, the first actuation event input comprising commencement of a calendar event in a calendaring application operable with the one or more processors.

11. The method of claim 1, the first actuation event input comprising compression of one or both of a first arched bridging member and a second arched bridging member of a pre-formed display assembly spanning a major face and at least two minor faces of a device housing of the electronic device toward the device housing.

12. The method of claim 1, wherein the first actuation event input and the second actuation event input are different.

13. The method of claim 12, wherein the first actuation event input comprises an incoming communication event and the second actuation event input comprises a calendar event in a calendaring application operable with the one or more processors.

14. An electronic device, comprising:
    a display;
    one or more sensors;
    one or more processors operable with the one or more sensors; and a status indicator configured as a band presented on the display on a perimeter portion of the display, circumscribing any other content presented on the display, and operable with the one or more processors in at least a first state and a second state that is different from the first state; and the one or more processors operating the status indicator in the perimeter portion in a first state in response to a first actuation event input and transitioning operation of the status indicator from the first state to the second state upon the one or more sensors detecting a second actuation event input occurring while the one or more processors operate the status indicator in the first state;

the first state and the second state identifying a status function indicating a status of an authorized user of the electronic device, the first state of the status indicator indicating the authorized user of the electronic device is busy and the second state of the status indicator indicating the authorized user of the electronic device is free.

15. The electronic device of claim 14, the first state and the second state further identifying whether the authorized user wishes to be disturbed.

16. The electronic device of claim 15, wherein the first actuation event input is different from the second actuation event input.

17. The electronic device of claim 16, wherein one or both of the first actuation event input or the second actuation event input comprise gesture inputs translating the electronic device in three-dimensional space.

18. The electronic device of claim 14, first state comprising a presentation of red light and the second state comprising a presentation of green light.

19. A method in an electronic device, the method comprising:

detecting, with one or more sensors of the electronic device, a major axis of the electronic device moving in a chopping motion in three-dimensional space;

causing, by one or more processors operable with the one or more sensors, presentation, by a display of the electronic device on a perimeter portion of the display of the electronic device, of a status indicator configured as a band circumscribing any other content presented on the display of the electronic device in a first state indicating a first status of an authorized user of the electronic device;

detecting, by the one or more sensors, the electronic device again moving in another chopping motion in the three-dimensional space while the status indicator is operating in the first state; and in response to the one or more sensors detecting the electronic device again moving in the another chopping motion in the three-dimensional space, presenting, by the one or more processors, the status indicator on the perimeter portion of the display in a second state indicating a second status of the authorized user of the electronic device;

wherein the first state indicates the authorized user of the electronic device is busy and the second state indicates the authorized user of the electronic device is free.

20. The method of claim 19, wherein the first state comprises an emission of red light by one or both of a first arched bridging member and a second arched bridging member of a pre-formed display assembly comprising a unitary pre-formed glass fascia spanning at least three sides of the electronic device, and the second state comprises an emission of green light by the one or both of the first arched bridging member and the second arched bridging member.

* * * * *